United States Patent
Tsuboi et al.

(10) Patent No.: US 10,873,982 B2
(45) Date of Patent: Dec. 22, 2020

(54) TERMINAL APPARATUS, CONTROL METHOD, AND INTEGRATED CIRCUIT

(71) Applicant: Sharp Kabushiki Kaisha, Sakai (JP)

(72) Inventors: Hidekazu Tsuboi, Sakai (JP); Katsunari Uemura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 28 days.

(21) Appl. No.: 15/328,567

(22) PCT Filed: Jul. 3, 2015

(86) PCT No.: PCT/JP2015/069331
§ 371 (c)(1),
(2) Date: Jan. 24, 2017

(87) PCT Pub. No.: WO2016/017373
PCT Pub. Date: Feb. 4, 2016

(65) Prior Publication Data
US 2017/0223757 A1    Aug. 3, 2017

(30) Foreign Application Priority Data

Jul. 31, 2014   (JP) ................. 2014-155639

(51) Int. Cl.
*H04W 76/14*    (2018.01)
*H04W 76/20*    (2018.01)
(Continued)

(52) U.S. Cl.
CPC ....... *H04W 76/14* (2018.02); *H04W 72/0413* (2013.01); *H04W 72/1284* (2013.01);
(Continued)

(58) Field of Classification Search
None
See application file for complete search history.

(56) References Cited

U.S. PATENT DOCUMENTS

2013/0287012 A1   10/2013   Pragada et al.
2013/0288668 A1   10/2013   Pragada et al.
(Continued)

FOREIGN PATENT DOCUMENTS

| CN | 103096503 A | 5/2013 |
| TW | 201406178 A | 2/2014 |
| WO | 2013/163595 A2 | 10/2013 |

OTHER PUBLICATIONS

LG Electronics Inc., "Prioritized reselection of D2D supported frequency", 3GPP TSG-RAN WG2 #86, R2-142631, May 19-23, 2014, pp. 1-3.
(Continued)

*Primary Examiner* — Jason E Mattis
*Assistant Examiner* — Hong Shao
(74) *Attorney, Agent, or Firm* — Keating & Bennett, LLP

(57) ABSTRACT

Provided is a technique related to a terminal apparatus, a control method, and an integrated circuit that are able to efficiently perform connection control when performing device-to-device communication. At a time of re-establishing radio resource control connection, at least on a basis of whether or not device-to-device data communication is able to be performed in a selected cell and whether or not there is data of the device-to-device data communication in the terminal apparatus, the terminal apparatus selects information about the device-to-device data communication, which is to be notified to the base station apparatus.

6 Claims, 6 Drawing Sheets

(51) Int. Cl.
*H04W 76/25* (2018.01)
*H04W 72/04* (2009.01)
*H04W 72/12* (2009.01)
*H04W 92/18* (2009.01)

(52) U.S. Cl.
CPC ........... *H04W 76/20* (2018.02); *H04W 76/25* (2018.02); *H04W 92/18* (2013.01)

(56) References Cited

U.S. PATENT DOCUMENTS

| | | | | |
|---|---|---|---|---|
| 2013/0322413 A1* | 12/2013 | Pelletier | ............ | H04W 72/1289 370/336 |
| 2014/0235248 A1 | 8/2014 | Chai et al. | | |
| 2015/0004901 A1* | 1/2015 | Agiwal | ................ | H04W 76/14 455/39 |
| 2015/0024763 A1* | 1/2015 | Lee | ..................... | H04W 72/082 455/450 |
| 2015/0215757 A1* | 7/2015 | Miskiewicz | ............ | H04W 4/90 455/404.1 |
| 2015/0341970 A1* | 11/2015 | Fukuta | .................. | H04W 48/08 370/254 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.0.0, Mar. 2014, pp. 1-34.

"3rd Generation Partnership Project; Technical Specification Group Radio Access Network; Study on LTE Device to Device Proximity Services; Radio Aspects (Release 12)", 3GPP TR 36.843 V12.0.1, Mar. 2014, pp. 1-50.

* cited by examiner

TERMINAL APPARATUS, CONTROL METHOD, AND INTEGRATED CIRCUIT

TECHNICAL FIELD

An embodiment of the present invention relates to a technique for a terminal apparatus, a control method, and an integrated circuit that efficiently perform cell selection when performing device-to-device communication.

BACKGROUND ART

In the 3GPP (3rd Generation Partnership Project) which is a standardization project, standardization of Evolved Universal Terrestrial Radio Access (hereinafter, referred to as EUTRA) is performed, in which high-speed communication is realized by adopting an OFDM (Orthogonal Frequency-Division Multiplexing) communication scheme and flexible scheduling with a predetermined frequency and time unit called a resource block.

Moreover, in the 3GPP, a discussion on Advanced EUTRA (LTE Advanced) that realizes higher-speed data transmission and has an upward compatibility with the EUTRA has been carried out.

In the LTE Advanced, a discussion has been carried out on a technique by which direct communication is performed from a device (terminal apparatus) to a device (terminal apparatus). The direct communication from a device to a device is referred to as D2D (Device to Device) or device-to-device communication. Note that, D2D which is standardized in the 3GPP is particularly referred to as LTE-D2D or also as LTE-Direct.

In order to realize services (Proximity based Services: ProSe) between terminal apparatuses being in proximity to each other in the D2D, a method for discovering a proximal terminal apparatus, a method for enabling direct communication between terminal apparatuses, and the like have been discussed in the 3GPP (NPL 1).

CITATION LIST

Non Patent Literature

NPL 1: 3GPP TS 36.843 V12.0.1 (2014-03) http://www.3gpp.org/DynaReport/36843.htm
NPL 2: 3GPP TS 36.304 V12.0.0 (2014-03) http://www.3gpp.org/DynaReport/36304.htm
NPL 3: R2-142631, LG Electronics Inc., "Prioritized reselection of D2D supported frequency" http://www.3gpp.org/ftp/tsg_ran/WG2_RL2/TSGR2_86/Docs/R2-142631.zip

SUMMARY OF INVENTION

Technical Problem

NPL 2 describes a cell selection procedure by which a terminal apparatus selects a cell to camp on in accordance with a list of cells that the terminal apparatus maintains, and information about reception power, reception quality of detected cells, or the like. NPL 2 also describes, for example, a cell reselection procedure by which a terminal apparatus in an idle mode performs reselection of a cell to camp on in accordance with reception quality of cells, priority of frequencies, and information indicating, for example, whether the terminal apparatus is interested in MBMS (Multimedia Broadcast and Multicast Service).

NPL 3 describes, for example, that only in a case where a terminal apparatus in an idle mode that is interested in the D2D camps on a specific frequency, when such D2D is able to be performed, priority of a frequency in which transmission and/or reception of the D2D are able to be performed is made the highest in a cell reselection procedure, so that the transmission and/or reception of the D2D are able to be performed.

However, NPL 3 indicates that the cell reselection is performed with changing the priority in a case where the terminal apparatus is interested in the D2D, but under the present circumstances, in a case where a terminal apparatus in communication with a base station apparatus detects a failure in radio link due to deterioration in radio-wave condition or the like, connection re-establishment is tried not by the cell reselection procedure but by a cell selection procedure, so that it is difficult to achieve efficient radio communication in consideration of the D2D only by introducing the cell reselection procedure in which the priority of the frequency in which the D2D is allowed is set to be high.

In a case where the terminal apparatus is not able to perform the D2D in a cell that is selected for trying connection re-establishment, it may be wasteful for the terminal apparatus, which has been subjected to radio connection in order to obtain a resource for the D2D, to try radio connection in a new cell.

Embodiments of the invention have been made in view of the aforementioned problems and an object thereof is to solve at least one of the aforementioned problems by providing a technique for a terminal apparatus, a control method, and an integrated circuit that are able to efficiently perform connection control when performing device-to-device communication.

Solution to Problem

In order to achieve the aforementioned object, following means are taken. That is, a terminal apparatus in an embodiment of the invention performs data communication with a base station apparatus and device-to-device data communication that is direct data communication between terminal apparatuses with use of a radio resource configured by the base station apparatus. In the terminal apparatus, at a time of re-establishing radio resource control connection with the base station apparatus, at least on a basis of whether or not the device-to-device data communication is able to be performed in a cell of the base station apparatus and whether or not there is data of the device-to-device data communication in the terminal apparatus, information about the device-to-device data communication, which is to be notified to the base station apparatus, is selected and notified.

A terminal apparatus according to an embodiment of the invention performs data communication with a base station apparatus and device-to-device data communication that is direct data communication between terminal apparatuses with use of a radio resource configured by the base station apparatus. In the terminal apparatus, at a time of re-establishing radio resource control connection with the base station apparatus, at least on a basis of whether or not the device-to-device data communication is able to be performed in a cell of the base station apparatus, control for continuing, suspending, or releasing a data radio bearer of the device-to-device data communication is performed.

A control method according to an embodiment of the invention is applied to a terminal apparatus that performs data communication with a base station apparatus and device-to-device data communication that is direct data communication between terminal apparatuses with use of a radio resource configured by the base station apparatus. The control method includes at least the step of, at a time of re-establishing radio resource control connection with the base station apparatus, at least on a basis of whether or not the device-to-device data communication is able to be performed in a cell of the base station apparatus and whether or not there is data of the device-to-device data communication in the terminal apparatus, selecting and notifying information about the device-to-device data communication, which is to be notified to the base station apparatus.

A control method according to an embodiment of the invention is applied to a terminal apparatus that performs data communication with a base station apparatus and device-to-device data communication that is direct data communication between terminal apparatuses with use of a radio resource configured by the base station apparatus. The control method includes at least the step of, at a time of re-establishing radio resource control connection with the base station apparatus, at least on a basis of whether or not the device-to-device data communication is able to be performed in a cell of the base station apparatus, performing control for continuing, suspending, or releasing a data radio bearer of the device-to-device data communication.

An integrated circuit according to an embodiment of the invention is mounted in a terminal apparatus that performs data communication with a base station apparatus and device-to-device data communication that is direct data communication between terminal apparatuses with use of a radio resource configured by the base station apparatus. The integrated circuit causes the terminal apparatus to exert the function of, at a time of re-establishing radio resource control connection with the base station apparatus, at least on a basis of whether or not the device-to-device data communication is able to be performed in a cell of the base station apparatus and whether or not there is data of the device-to-device data communication in the terminal apparatus, selecting and notifying information about the device-to-device data communication, which is to be notified to the base station apparatus.

An integrated circuit according to an embodiment of the invention is mounted in a terminal apparatus that performs data communication with a base station apparatus and device-to-device data communication that is direct data communication between terminal apparatuses with use of a radio resource configured by the base station apparatus. The integrated circuit causes the terminal apparatus to exert the function of, at a time of re-establishing radio resource control connection with the base station apparatus, at least on a basis of whether or not the device-to-device data communication is able to be performed in a cell of the base station apparatus, performing control for continuing, suspending, or releasing a data radio bearer of the device-to-device data communication.

Advantageous Effects of Invention

As described above, according to an embodiment of the invention, it is possible to provide a technique related to a terminal apparatus, a control method, and an integrated circuit that are able to efficiently perform connection control when performing device-to-device communication.

DESCRIPTION OF EMBODIMENTS

Figure 1:
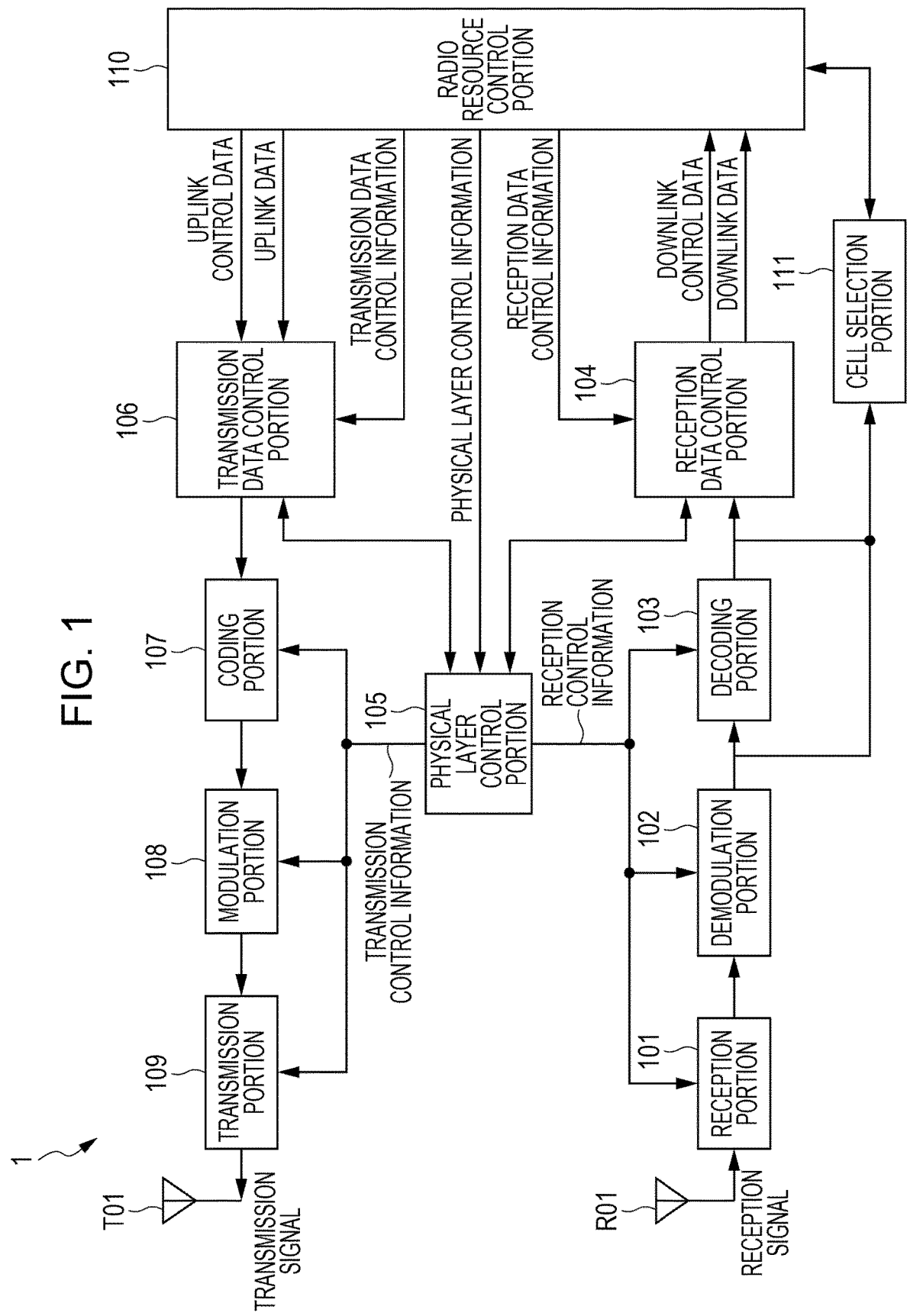
FIG. 1 is a block diagram illustrating an example of a schematic configuration of a terminal apparatus according to an embodiment of the invention.

A technique related to each embodiment of the invention will be briefly described below.

[Physical Channel/Physical Signal]

Description will be given for a physical channel and a physical signal which are primarily used in EUTRA and Advanced EUTRA. A channel means a medium used for signal transmission and reception, and a physical channel means a physical medium used for signal transmission and reception. In the invention, a physical channel and a signal may be used synonymously. There is a possibility that, in the EUTRA and the Advanced EUTRA, a physical channel is added or a structure or a format style thereof is modified or added in the future, but even when modification or addition is made, there is no influence on the description of each embodiment of the invention.

In the EUTRA and the Advanced EUTRA, scheduling of the physical channel or the physical signal is managed by using a radio frame. One radio frame is 10 ms and one radio frame is configured by ten subframes. Further, one subframe is configured by two slots (that is, one subframe has 1 ms and one slot has 0.5 ms). Moreover, management is performed by using a resource block as a minimum unit of scheduling, in which physical channels are arranged. The resource block is defined as a fixed frequency domain in which a frequency axis is formed by an assembly of a plurality of subcarriers (for example, twelve subcarriers) and a domain formed by a fixed transmission time interval (one slot).

Synchronization signals are configured by three types of primary synchronization signals and secondary synchronization signals that are formed by 31 types of codes which are arranged alternately in a frequency domain, and a combination of signals of the primary synchronization signals and the secondary synchronization signals indicates 504 cell identifiers (physical cell ID (PCI: Physical Cell Identity)), which identify a base station apparatus, and a frame timing for radio synchronization. A terminal apparatus specifies a physical cell ID of synchronization signals received by cell search.

A physical broadcast channel (PBCH) is transmitted for the purpose of notifying (configuring) a control parameter (broadcast information (system information (SI)) which is commonly used in terminal apparatuses in a cell. Regarding broadcast information which is not notified by the physical broadcast information channel, a radio resource whose broadcast information is transmitted is notified to a terminal apparatus in a cell by a physical downlink control channel, and in the notified radio resource, a layer 3 message (system information) for notifying the broadcast information is transmitted by a physical downlink shared channel.

As the broadcast information, a cell global identifier (CGI) indicating an identifier of an individual cell, a tracking area identifier (TAI) for managing a standby area by paging, random access configuration information, transmission timing adjustment information, shared radio resource configuration information in the cell, neighboring cell information, uplink access restriction information, or the like is notified.

Downlink reference signals are classified into a plurality of types depending on intended use thereof. For example, cell-specific RSs (CRSS: Cell-specific Reference Signals) are pilot signals which are transmitted with predetermined power for each cell, and are downlink reference signals which are iterated periodically in a frequency domain and a time domain on the basis of a predetermined rule. The terminal apparatus measures reception quality of each cell by receiving the cell-specific RSs. Moreover, the terminal apparatus uses the downlink cell-specific RSs also as reference signals for demodulation of the physical downlink control channel or the physical downlink shared channel, which is transmitted at the same time with the cell-specific RSs. As a sequence used for the cell-specific RSs, a sequence which is identifiable for each cell is used.

The downlink reference signals are used also for estimation of channel fluctuation of the downlink. The downlink reference signals used for the estimation of channel fluctuation are referred to as channel state information reference signals (CSI-RSs). The downlink reference signals which are configured individually to terminal apparatuses are referred to as UE specific reference signals (URSs) or dedicated RSs (DRSs), and referred to for channel compensation processing of a channel when the physical downlink control channel or the physical downlink shared channel is demodulated.

The physical downlink control channel (PDCCH) is transmitted in several OFDM symbols (for example, 1 to 4 OFDM symbols) from beginning of each subframe. An enhanced physical downlink control channel (EPDCCH) is a physical downlink control channel that is arranged in an OFDM symbol in which the physical downlink shared channel PDSCH is arranged. The PDCCH or the EPDCCH is used for the purpose of notifying the terminal apparatus of radio resource assignment information according to scheduling of a base station apparatus and information for giving an instruction of an adjustment amount of increase or decrease in transmit power. Hereinafter, when simply described as the physical downlink control channel (PDCCH), it means both physical channels of the PDCCH and the EPDCCH unless otherwise specified.

The terminal apparatus needs to acquire, from the physical downlink control channel, radio resource assignment information called uplink grant in the case of transmission and downlink grant (downlink assignment) in the case of reception by monitoring the physical downlink control channel addressed to the terminal apparatus before transmitting or receiving a layer 2 message and a layer 3 message (paging, hand-over command, and the like) that are downlink data or downlink control data, and by receiving the physical downlink control channel addressed to the terminal apparatus. Note that, the physical downlink control channel may be configured so as to be, other than to be transmitted in the OFDM symbols described above, transmitted in a domain of a resource block assigned from the base station apparatus to the terminal apparatus in an individual (dedicated) manner.

A physical uplink control channel (PUCCH) is used for performing a reception confirmation response (ACK/NACK: ACKnowledgement/Negative ACKnowledgement) of data transmitted on the physical downlink shared channel, channel (channel state) information (CSI: Channel State Information) of the downlink, and a radio resource assignment request (a radio resource request or a scheduling request (SR)) of the uplink.

CSI includes a CQI (Channel Quality Indicator), a PMI (Precoding Matrix Indicator), a PTI (Precoding Type Indicator), and an RI (Rank Indicator). Each indicator may be described as indication.

The physical downlink shared channel (PDSCH) is used also for notifying the terminal apparatus of, in addition to the downlink data, broadcast information (system information), which is not notified by paging or the physical broadcast information channel, as the layer 3 message. Radio resource assignment information of the physical downlink shared channel is indicated by the physical downlink control channel. The physical downlink shared channel is arranged and transmitted in the OFDM symbol other than the OFDM symbol in which the physical downlink control channel is transmitted. That is, the physical downlink shared channel and the physical downlink control channel are subjected to time division multiplexing in one subframe.

A physical uplink shared channel (PUSCH) mainly transmits uplink data and uplink control data, and may include control data such as reception quality of the downlink and ACK/NACK. Moreover, it is used also for notifying the base station apparatus of uplink control information, in addition to the uplink data, as the layer 3 message from the terminal apparatus. Similarly to the downlink, radio resource assignment information of the physical uplink shared channel is indicated by the physical downlink control channel.

An uplink reference signal (also referred to as an uplink pilot signal or an uplink pilot channel) includes a demodulation reference signal (DMRS) which is used by the base station apparatus for demodulating the physical uplink control channel PUCCH and/or the physical uplink shared channel PUSCH, and a sounding reference signal (SRS) which is used by the base station apparatus mainly for estimating a channel state of the uplink. As the sounding reference signal, there are a periodic sounding reference signal (Periodic SRS) which is transmitted periodically and an aperiodic sounding reference signal (Aperiodic SRS) which is transmitted when an instruction is given from the base station apparatus.

A physical random access channel (PRACH) is a channel which is used for notifying (configuring) a preamble sequence and has a guard time. The preamble sequence is configured so as to notify the base station apparatus of information by a plurality of sequences. For example, when sixty-four types of sequences are prepared, it is possible to indicate 6-bit information to the base station apparatus. The physical random access channel is used as access means of the terminal apparatus to the base station apparatus.

The terminal apparatus uses the physical random access channel, for example, for making a radio resource request of the uplink when the physical uplink control channel is not configured, or requesting, to the base station apparatus, transmission timing adjustment information (also called timing advance (TA)) which is required for aligning an uplink transmission timing to a reception timing window of the base station apparatus. Moreover, the base station apparatus may request the terminal apparatus to initiate a random access procedure by using the physical downlink control channel.

Discussion has been carried out on using a D2D synchronization signal (D2DSS), a physical D2D synchronization channel (PD2DSCH), or the like as a physical channel related to the D2D.

The D2D synchronization signal is configured by two synchronization signals of a PD2DSS (Primary D2DSS) and an SD2DSS (Secondary D2DSS). When the base station apparatus serves as a synchronization source, a primary synchronization signal and a secondary synchronization signal are respectively used as the PD2DSS and the SD2DSS. When the synchronization source is other than the base station apparatus, a primary D2D synchronization signal (PD2DSS) of a Zadoff-Chu sequence and a secondary D2D synchronization signal (SD2DSS) of an M sequence are used.

It has been considered that the physical D2D synchronization channel is transmitted from a terminal apparatus which transmits the D2D, and transmitted for the purpose of notifying control information (for example, a synchronization ID related to the terminal apparatus that performs the transmission, a resource pool, a system bandwidth, a TDD subframe configuration, and the like) about the D2D, a D2D frame number, etc.

It has been also considered that a terminal apparatus on a transmission side transmits scheduling assignments (SA) to a terminal apparatus on a reception side in the D2D. The SA is able to explicitly or implicitly notify, for example, timing adjustment information about transmission data related to the D2D (D2D Reception Timing Advance (D2D-TA)), ID information with which a content (type) of the D2D is identified, and radio resource patterns of the transmission data (RPT; Resource Patterns for Transmission) corresponding to the ID information.

The terminal apparatus which has received the SA is able to receive the transmission data related to the D2D by adjusting a reception timing thereof on the basis of a timing acquired from the D2D synchronization signal and the timing adjustment information included in the SA. Note that, the timing adjustment information of the transmission data related to the D2D may be transmitted by the PD2DSCH.

As information of the transmission data related to the D2D, which is indicated by the RPT, there are bandwidth information, resource information of a frequency domain, frequency hopping information, resource information of a time domain, and the like. The terminal apparatus which performs transmission through the D2D may use the PUSCH as a physical channel by which the SA and the transmission data related to the D2D are notified, or may assign an exclusive physical channel individually. In the case of using the PUSCH, the terminal apparatus which performs reception through the D2D needs to receive the PUSCH with a corresponding frequency and perform decoding.

Note that, since other physical channels or physical signals are not strongly related to each embodiment of the invention, detailed description thereof will be omitted. Examples of the physical channels or physical signals whose description will be omitted include a physical control format indicator channel (PCFICH), a physical hybrid ARQ indicator channel (PHICH), a physical multicast channel (PMCH), and the like.

[Radio Network and Cell Type]

A communication available range (communication area) of each frequency which is controlled by the base station apparatus is regarded as a cell. In this case, communication areas covered by the base station apparatus may have different areas and different shapes for each frequency. Moreover, areas which are covered may be different for each frequency. A radio network in which cells which are different in types of base station apparatuses and sizes of cell radii are mixed in areas with the same frequency or different frequencies to form one communication system is referred to as a heterogeneous network.

The terminal apparatus may regard, as a suitable cell, a cell to which access of the terminal apparatus is determined not to be prohibited on the basis of broadcast information notified from the base station apparatus and in which reception quality of the downlink fulfills a designated condition and normal services are permitted accordingly when the terminal apparatus camps on the cell.

A cell which is not determined as a suitable cell in a cell selection procedure or a cell reselection procedure and in which only a part of limited services is permitted may be regarded as a restricted cell (acceptable cell). Note that, the terminal apparatus is able to camp on even the restricted cell. Examples of the part of services include emergency call. There are also a reserved cell for a service for an operator, which is not able to be used by a normal terminal apparatus, and a barred cell in which access is barred, and whether the cell is a reserved cell or a barred cell is able to be determined on the basis of system information of the cell.

The terminal apparatus searches for a suitable cell in the cell selection procedure and the cell reselection procedure, and when a suitable cell is not found, searches for a restricted cell (acceptable cell).

When the terminal apparatus moves from the camped cell to another cell, the movement is performed by the cell reselection procedure in a non-radio resource control connection mode (in an idle mode or a non-communication state), or by a handover procedure at a time of radio resource control connection (in a connected mode or a communication state). In a state of camping on a cell (idle mode) or in a connected mode in a certain cell, the terminal apparatus may be judged to be positioned in an area where communication with the base station apparatus is allowed, that is, in a service region (in-coverage) of the cell.

The base station apparatus manages one or more cells for each frequency. One base station apparatus may manage a plurality of cells. Cells are classified into a plurality of types in accordance with sizes (cell sizes) of areas in which communication is allowed with the terminal apparatus. For example, cells are classified into macro cells and small cells. A small cell is a cell which generally covers from several meters to several tens of meters of a radius. Further, the small cells are classified into femto cells, pico cells, nano cells, and the like in accordance with sizes of areas thereof in some cases.

When the terminal apparatus is able to communicate with a certain base station apparatus, a cell which is used for communication with the terminal apparatus is a serving cell and other cells which are not used for the communication are referred to as neighboring cells among cells of the base station apparatus.

A frequency of the serving cell is also referred to as the same frequency (Intra-frequency) or a serving frequency. A frequency which is not the same frequency is referred to as a different frequency (Inter-frequency). In a case where a plurality of serving cells are configured to the terminal apparatus by carrier aggregation or the like, it is regarded that there are a plurality of corresponding serving frequencies. A serving cell in which transmission or reception of data of a control-plane in the carrier aggregation is particularly referred to also as a primary cell (PCell).

[Radio Protocol Architecture]

Figure 5:
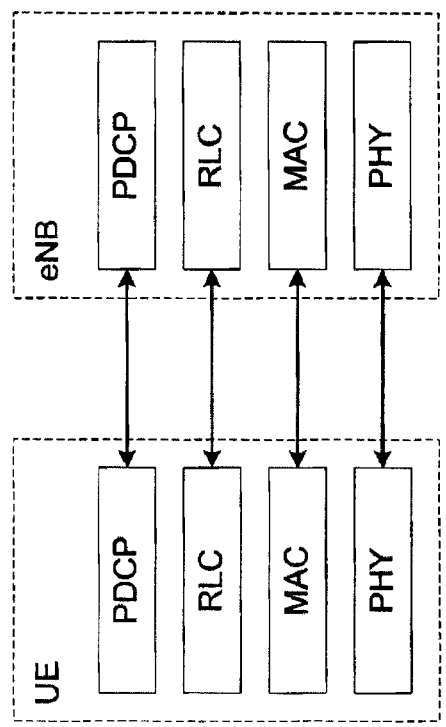
FIG. 5 illustrates a user-plane (UP (U-Plane)) protocol stack according to an embodiment of the invention.
Figure 6:
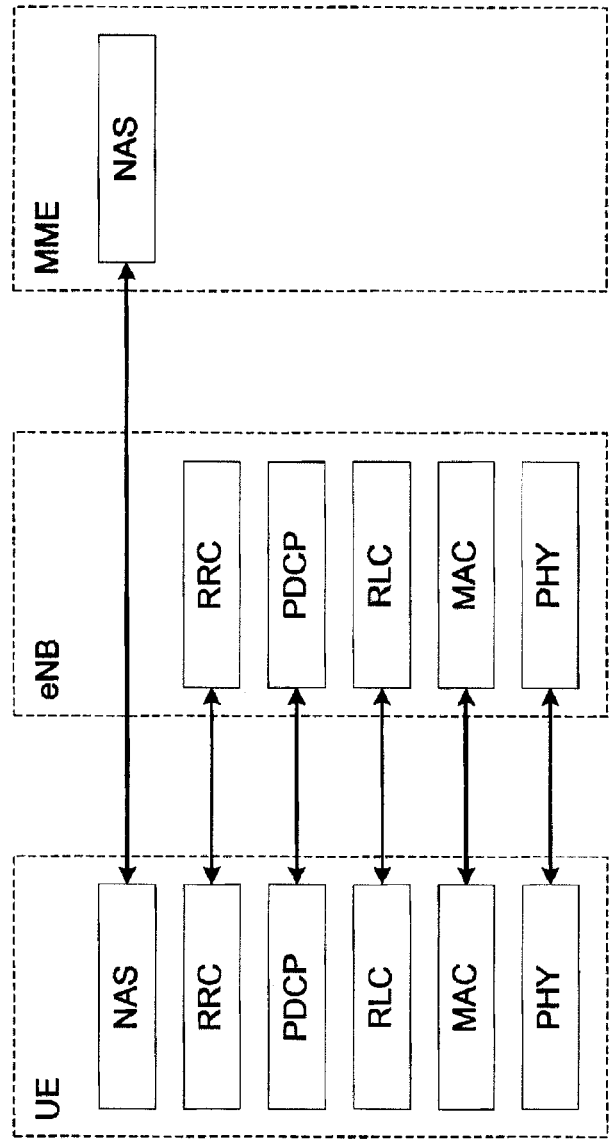
FIG. 6 illustrates a control-plane (CP (C-Plane)) protocol stack according to the embodiment of the invention.

FIG. 5 illustrates a user-plane (UP (U-Plane)) protocol stack for treating user data of a terminal apparatus and a base station apparatus in a radio network of the EUTRA (EUTRAN). FIG. 6 illustrates a control-plane (CP (C-Plane)) protocol stack for treating control data.

In FIG. 5 and FIG. 6, a physical layer (PHY layer) provides a higher layer with a transmission service by using a physical channel. The PHY layer is connected to a higher medium access control layer (MAC layer) via a transport channel. Data is transferred between layers of the MAC layer and the PHY layer through the transport channel. Data is transmitted or received between the PHY layers of the terminal apparatus and the base station apparatus through the physical channel.

The MAC layer maps various logical channels into various transport channels. The MAC layer is connected to a higher radio link control layer (RLC layer) through the logical channel. The logical channels are roughly classified in accordance with types of information to be transmitted, and are classified into control channels for transmitting control information and traffic channels for transmitting user information. The MAC layer has a function of controlling the PHY layer in order to perform discontinuous reception and discontinuous transmission (DRX and DTX), a function of carrying out a random access procedure, a function of notifying transmission power information, a function of performing HARQ control, and the like.

The RLC layer segments and concatenates data received from a higher layer, and adjusts data sizes such that a lower layer is able to appropriately transmit data. In addition, the RLC layer has a function of guaranteeing a QoS (Quality of Service) that is requested by each data. That is, the RLC layer has a function of controlling retransmission of data, and the like.

A packet data convergence protocol layer (PDCP layer) has a header compression function of compressing unnecessary control information in order to efficiently transmit an IP packet, which is user data, in a radio section. In addition, the PDCP layer also has a data encryption function.

Further, the control-plane protocol stack has a radio resource control layer (RRC layer). The RRC layer configures or reconfigures a radio bearer (RB), and controls a logical channel, a transport channel, and a physical channel. RBs are classified into a signaling radio bearer (SRB) and a data radio bearer (DRB), and the SRB is used as a path for transmitting an RRC message which is control information. The DRB is used as a path for transmitting user data. The respective RBs are configured between the RRC layers of the base station apparatus and the terminal apparatus.

The SRBs are defined as three types of an SRB0, an SRB1, and an SRB2. The SRB0 is for an RRC message using the CCCH of the logical channel. The SRB1 is for an RRC message (including a NAS message delivered by the RRC message) using the DCCH of the logical channel and a NAS message delivered before the SRB2 is established. The SRB2 is for an RRC message and a NAS message that include recorded measurement information. The SRB2 has lower priority than the SRB1 and is always configured by a network of the EUTRA after security is activated. The DRB is also configured by the network of the EUTRA after security is activated.

Note that, the PHY layer corresponds to a physical layer which is a first layer of a hierarchical structure of a generally known Open Systems Interconnection (OSI) model, the MAC layer, the RLC layer, and the PDCP layer correspond to a data link layer which is a second layer of the OSI model, and the RRC layer corresponds to a network layer which is a third layer of the OSI model.

A signaling protocol used between a network and the terminal apparatus is divided into an access layer (Access Stratum: AS) protocol and a non-access layer (Non-Access Stratum: NAS) protocol. For example, a protocol lower than the RRC layer is an access layer protocol used between the terminal apparatus and the base station apparatus. A protocol of connection management (CM), mobility management (MM), or the like of the terminal apparatus is a non-access layer protocol and used between the terminal apparatus and a core network (CN). For example, as illustrated in FIG. 6, communication using the non-access layer protocol is transparently performed between the terminal apparatus and mobility management entity (MME) via the base station apparatus.

[Random Access Procedure]

A random access procedure will be described below. The random access procedure has two access procedures of a contention based random access procedure and a non-contention based random access procedure.

The contention based random access procedure is a random access procedure in which contention among mobile station apparatuses may occur, and is performed, for example, to make a scheduling request when initial access is performed in a state where connection to (communication with) the base station apparatus has not been performed or when uplink data transmission occurs in the mobile station apparatus in a state where connection to the base station apparatus has been performed but uplink synchronization is lost.

The non-contention based random access procedure is a random access procedure in which contention among mobile station apparatuses does not occur, and the mobile station apparatus starts the random access procedure in response to an instruction from the base station apparatus in special cases, such as in a case where handover is performed to quickly achieve uplink synchronization between the mobile station apparatus and the base station apparatus when uplink synchronization is lost though a connection between the base station apparatus and the mobile station apparatus has been performed, or in a case where a transmission timing of the mobile station apparatus is invalid. An instruction for the non-contention based random access procedure is given by a message of an RRC (Radio Resource Control: Layer 3) layer and control data on the physical downlink control channel PDCCH.

The contention based random access procedure will be briefly described. First, a terminal apparatus transmits a random access preamble to a base station apparatus (message 1: (1)). The base station apparatus that has received the random access preamble then transmits a response (random access response) to the random access preamble to the terminal apparatus (message 2: (2)). The terminal apparatus transmits a higher layer (Layer 2/Layer 3) message on the basis of scheduling information included in the random access response (message 3: (3)). The base station apparatus transmits a contention check message to the terminal apparatus from which the higher layer message of (3) has been successfully received (message 4: (4)). Note that, the contention based random access is also referred to as random preamble transmission.

Next, the non-contention based random access procedure will be briefly described. First, the base station apparatus notifies the terminal apparatus of a preamble number (or a sequence number) and a random access channel number to be used (message 0: (1)'). The terminal apparatus transmits a random access preamble of the specified preamble number on the specified random access channel RACH (message 1: (2)'). Then, the base station apparatus that has received the random access preamble transmits a response (random access response) to the random access preamble to the terminal apparatus (message 2: (3)'). In a case where a value of the notified preamble number is 0, however, the contention based random access procedure is carried out. Note that, the non-contention based random access procedure is also referred to as dedicated preamble transmission.

[Uplink Data Transmission]

Transmission of uplink data will be described below. The physical uplink control channel PUCCH is used for transmitting a response (ACK/NACK) to downlink data transmitted on the physical downlink shared channel PDSCH, radio channel quality information (Channel Quality Indicator: CQI) of the downlink, and a transmission request (Scheduling Request: SR) of uplink data. When making a transmission request of the uplink data, the terminal apparatus transmits, to the base station apparatus, a scheduling request by using the physical uplink control channel PUCCH assigned from the base station apparatus.

When a resource of the physical uplink shared channel PUSCH is assigned from the base station apparatus after transmitting the scheduling request, the terminal apparatus transmits a buffer status report (BSR) indicating buffer status information of transmission data of the terminal apparatus with the assigned resource of the physical uplink shared channel PUSCH. Note that, the base station apparatus makes uplink data scheduling for the terminal apparatus on the basis of the buffer status report.

When a resource of the physical uplink shared channel PUSCH is not assigned from the base station apparatus after transmitting the scheduling request, the terminal apparatus transmits the scheduling request again. When a resource of the physical uplink shared channel PUSCH is not assigned from the base station apparatus even after repeating retransmission of the scheduling request, the terminal apparatus releases the assigned physical uplink control channel PUCCH and uplink reference signal and carries out a random access procedure targeting for the scheduling request. Note that, in the scheduling request by the random access procedure, the terminal apparatus transmits the buffer status report by the message 3.

[Detailed Function of MAC Layer]

A function of the MAC layer of the terminal apparatus will be described below more specifically. The MAC layer has a function of mapping each logical channel into a transport channel. The MAC layer also has a function of generating transmission data from a logical channel in accordance with priority. This procedure is called a logical channel prioritization (LCP). In the basic LCP procedure, priority of transmitting transmission data is decided by considering priority of logical channels and a transmission bit rate (Prioritized Bit Rate: PBR) at which transmission needs to be performed within a fixed time period corresponding to a QoS of a radio bearer, and transmission data is generated from data having high priority of transmission at a time when an uplink grant is received. During connection with the base station apparatus, the MAC layer acquires, from the RRC layer, information about a logical channel number of each RB, the priority of the logical channels, the PBR, and the like.

The MAC layer also has a function of notifying a quantity of data of the transmission buffer (transmission buffer status) corresponding to each logical channel. This function is called a buffer status report (BSR). The buffer status report is also referred to as a transmission buffering quantity report. With the BSR, the logical channels are assigned to logical channel groups (LCGs) and the transmission buffering quantity (buffer status) for each of the LCGs is notified to the base station apparatus as an MAC layer message (MAC CE).

[Radio Resource Control Connection Re-Establishment]

The terminal apparatus executes a radio resource control connection re-establishment procedure in order to keep a connected mode (radio resource control connection), for example, in a case where it is not possible to follow a part or all of configurations included in a radio resource control connection re-configuration message notified from the base station apparatus and security of the AS layer is in an activated state, in a case where a radio link is failed ((1) in a case where a timer T310 which starts to count time when a problem is detected in a physical layer expires, (2) in a case where a timer T312 which is configured at a time of measurement and starts to count time when a measurement report is triggered during time counting of the timer T310 expires, (3) in a case where a random access problem is indicated from the MAC layer when any of a timer T300 which starts to count time at a time of transmission of a radio resource control connection request message, a timer T301 which starts to count time at a time of transmission of a radio resource control connection re-establishment request message, a timer T304 which starts to count time at a time of reception of a radio resource control connection re-configuration message including mobility control information, and a timer T311 which starts to count time at a time of starting the radio resource control connection re-establishment procedure is not counting time, (4) in a case where it is notified from the RLC layer that the number of times of retransmission reaches the maximum number of times, or the like) and security of the AS layer is in an activated state, or in a case where handover fails.

The connection re-establishment is performed successfully only when (the base station apparatus of) a cell for which connection is tried is ready (having a valid context of a terminal apparatus). On the other hand, it is also possible to perform the connection re-establishment successfully when the base station apparatus having no context of a terminal apparatus acquires a valid context from the base station apparatus that has the context of the terminal apparatus.

As the connection re-establishment procedure, when the timer T310 or the timer T312 is counting time, the terminal apparatus firstly stops time counting of each of them and starts time counting of the timer T311. Subsequently, the terminal apparatus suspends a radio bearer other than the SRB0. The terminal apparatus then resets the MAC layer and starts a cell selection procedure by applying a standard (default) configuration to the MAC layer and the physical layer.

When a suitable cell is selected by the connection re-establishment procedure, the terminal apparatus stops the timer T311, starts time counting of the timer T301, and transmits a connection re-establishment request message in the selected cell to the base station apparatus. The connection re-establishment request message includes information indicating a reason of re-establishment (such as a failure in the re-configuration, a handover failure, and other failures).

When the terminal apparatus having transmitted the connection re-establishment request message receives a connection re-establishment message from the base station apparatus, the terminal apparatus stops time counting of the timer T301 and re-establishes the PDCP and the RLC of the SRB1. The terminal apparatus further configures a radio resource and resumes the SRB1 which has been suspended. The terminal apparatus performs integrity and ciphering by using the configuration before the connection re-establishment is performed, and when processing is normally completed, notifies the base station apparatus of a radio resource control re-establishment completion message.

When a suitable cell is not selected by the connection re-establishment procedure, the timer T311 expires and the radio resource control connection fails, so that the terminal apparatus shifts from the connected mode to the idle mode. Also when the cell becomes not suitable for a reason that the timer T301 expires or that the selected suitable cell does not meet a cell selection criterion, etc., the radio resource control connection fails, so that the terminal apparatus shifts from the connected mode to the idle mode.

[D2D]

The D2D (device-to-device communication) includes, as services (Proximity based Services: ProSe) between proximal terminal apparatuses, a technique (ProSe Didcovery) for discovering a proximal terminal apparatus and a technique (ProSe Communication, also referred to as device-to-device data communication) by which a terminal apparatus performs direct communication with one or more terminal apparatuses.

In the D2D, a resource (radio resource) and a configuration which are used by the terminal apparatus and related to the D2D may be configured (controlled) by the base station apparatus. That is, in a case where the terminal apparatus is in a non-radio resource control connection mode (idle mode), the radio resource and the configuration which are related to the D2D may be notified for each cell with broadcast information, and in a case where the terminal apparatus is in a radio resource control connection mode (connected mode), the radio resource and the configuration which are related to the D2D communication may be notified with an RRC message. That is, the D2D communication is realized by terminal apparatuses which are capable of direct communication (D2D capable, D2D supported) between terminal apparatuses and a base station apparatus which is capable of controlling a resource for such direct communication between the terminal apparatuses.

In a case where the communication is performed in groupcast or broadcast in the ProSe Communication (device-to-device data communication), a step of discovering a communication partner by the ProSe Discovery is not necessarily required.

Moreover, in the ProSe Communication (device-to-device data communication), a radio resource by which scheduling assignments (SA) are transmitted is provided to terminal apparatuses from a resource pool (SA resource pool) in which radio resources are pooled for the SA. A terminal apparatus on a transmission (source) side transmits the SA with the radio resource (time and frequency) included in the resource pool. A terminal apparatus on a reception (target or destination) side receives the SA with the radio resource (time and frequency) included in the resource pool.

In addition, in the ProSe Communication (device-to-device data communication), a radio resource used for transmitting transmission data (data transmitted or received between devices) related to the D2D is provided to terminal apparatuses from a resource pool (D2D data resource pool) prepared for the data. A terminal apparatus on a transmission side transmits the transmission data related to the D2D by using the radio resource (time and frequency) designated from the resource pool. A terminal apparatus on a reception side receives the data related to the D2D with the radio resource (time and frequency) designated from the resource pool. The resource pool may be indicated with frequency information, information which indicates a range of a resource block to be assigned, information of a frame number or a subframe number at which the resource pool is started and an offset value, or the like.

In this case, the resource pool (first resource pool) in which the radio resource to be used for the SA is pooled and the resource pool (second resource pool) in which the radio resource to be used for the transmission data related to the D2D is pooled may be configured in advance (reserved) with broadcast information, individually notified (or informed) from the base station apparatus to each terminal apparatus, notified (or informed) from a different terminal apparatus, pre-configured, or assigned in a semi-static manner.

In a case where the assignment is performed in a semi-static manner, the configuration may be typically recorded in a SIM (Subscriber Identity Module). The SIM may be an IC card provided by hardware or may be provided by software.

Here, as a method of assigning the radio resource related to the device-to-device data communication (the SA or the transmission data related to the D2D) from the resource pool to the terminal apparatus, a method (also referred to as a Mode 1 or a scheduled method) in which the terminal apparatus notifies, to the base station apparatus, that there is transmission data related to the D2D and thereby a transmission resource is individually assigned from the base station apparatus to the terminal apparatus may be used, or a method (also referred to as a Mode 2 or an autonomous method) in which the terminal apparatus selects and uses a transmission resource from the broadcast information or the resource pool which is configured in advance (reserved) may be used.

The Mode 1 is used when the terminal apparatus is positioned in a range regarded as being in-coverage, and the Mode 2 is used when the terminal apparatus is not positioned in a range regarded as being in-coverage (are positioned out-of-coverage) or when usage of a resource of the Node 2 is permitted by the base station apparatus in the coverage (a transmission resource of the Mode 2 is assigned to broadcast information). Note that, even when the radio resource assigned from the base station apparatus (that is, Mode 1) is used, the terminal apparatus temporarily uses the radio resource selected by the terminal apparatus (that is, uses Mode 2) in some cases during an RRC radio resource re-connection procedure or the like.

The terminal apparatus that is permitted to use device-to-device data communication may perform data communication of the Mode 2 in the idle mode when usage of the data communication of the Mode 2 is permitted by the base station apparatus that supports the device-to-device data communication, and be connected to the base station apparatus for performing data communication of the Mode 1 when usage of the data communication of the Mode 2 is not permitted. In a case where the base station apparatus does not support the device-to-device data communication, when the terminal apparatus is in the idle mode, cell reselection is performed for a base station apparatus which supports the device-to-device data communication, and when the terminal apparatus is in the connected mode, information (such as an identifier and frequency information of a desired service) indicating a desire for the device-to-device data communication may be notified to the base station apparatus. Alternatively, desire information of a multicast/broadcast service may be notified instead to a base station apparatus that is not able to recognize the information indicating a desire for the device-to-device data communication.

In the ProSe Communication, when one-to-M (M is a natural number) broadcast communication is used, a signal transmitted by a certain terminal apparatus is able to be received by a plurality of different terminal apparatuses, and the terminal apparatus on the transmission side and each of the terminal apparatuses on the reception side may reverse their roles. In the case of use for public safety, the broadcast communication needs to be performed even in the case of being out-of-coverage of the base station apparatus. The broadcast communication supports both a dedicated frequency (carrier) and a frequency which is used for a normal communication service via the base station apparatus. Since the broadcast communication is one-way communication, feedback in a layer 2 (MAC/RLC/PDCP layers) is not assumed. That is, communication is performed in an unacknowledge mode (UM) in which retransmission control by the HARQ is not performed in the MAC layer and error correction by the ARQ is not performed in the RLC layer. When one-to-one communication is used, it is considered to apply the 1-to-M broadcast communication (M=1) or to perform feedback in the layer 2 by performing unicast communication.

As a parameter for performing the device-to-device data communication, type information (the Mode 1, the Mode 2, or common) of the SA pool, SA time period information (an assignment period of an SA transmission resource), subframe information used for the data transmission of the Mode 2, position information (a start position or an end position) of a physical resource block of the SA resource pool, or the like is informed or notified from the base station apparatus (and a terminal apparatus which transfers information to a terminal apparatus out-of-coverage of the base station apparatus) to the terminal apparatus.

As a logical channel for performing the device-to-device data communication, ProSe Communication Traffic Channel (PTCH) is defined, and as a transport channel for performing the device-to-device data communication, ProSe Communication Shared Channel (PSCH) is defined. In the device-to-device data communication, the PTCH as the logical channel is mapped into the PSCH as the transport channel.

As a parameter of the MAC layer of the device-to-device data communication, an identifier (Source Layer2 ID) of a transmission source and an identifier (Destination Layer2 ID) of a transmission destination are configured. On the basis of the two identifiers and the identifier of the logical channel, for each combination thereof, a pair of entities of the PDCP layer and the RLC layer is established. In the MAC layer, an MAC SDU in which the identifier of the transmission source and the identifier of the transmission destination are the same may be multiplexed with one MAC PDU. Moreover, in the case of an MAC SDU in which the identifier of the transmission source and the identifier of the transmission destination are the same, MAC SDUs of a plurality of logical channels may be multiplexed with one MAC PDU.

One radio bearer used for the device-to-device data communication is mapped only into an identifier (Destination Layer2 ID) of one transmission destination. Note that, a plurality of radio bearers may be mapped into an identifier of one transmission destination.

Description will hereinafter be given in detail for appropriate embodiments of the invention with reference to accompanying drawings while considering above matters. Note that, in the description of the embodiments of the invention, when it is judged that specific description of known functions or configurations related to the embodiments of the invention makes the subject matter of the embodiments of the invention unclear, the detailed description thereof will be omitted.

First Embodiment

A first embodiment of the invention will be described below.

FIG. 1 is a block diagram illustrating an example of a terminal apparatus 1 in the first embodiment of the invention. This terminal apparatus 1 is composed of at least a reception portion 101, a demodulation portion 102, a decoding portion 103, a reception data control portion 104, a physical layer control portion 105, a transmission data control portion 106, a coding portion 107, a modulation portion 108, a transmission portion 109, a radio resource control portion 110, a cell selection portion 111, a transmit antenna T01, and a receive antenna R01. The "portion" in the figure is an element which realizes functions and each procedure of the terminal apparatus 1, which is represented also as a term of a section, a circuit, a configuration apparatus, a device, a unit, and the like.

The radio resource control portion 110 executes each function of an RRC (Radio Resource Control) layer which carries out radio resource control of the terminal apparatus 1. The reception data control portion 104 and the transmission data control portion 106 execute each function of an MAC (Medium Access Control) layer, an RLC (Radio Link Control) layer, and a PDCP (Packet Data Convergence Protocol) layer, which manage a data link layer.

Note that, in order to support transmission and reception processing of a plurality of frequencies (frequency bands, frequency bandwidths) or in the same subframe of a cell through the carrier aggregation and/or the device-to-device communication, the terminal apparatus 1 may have a configuration including a plurality of sets each of which is formed by a part or whole of reception-based blocks (the reception portion 101, the demodulation portion 102, the decoding portion 103, and the receive antenna R01), the plurality of frequencies (frequency bands, frequency bandwidths), and transmission-based blocks (the coding portion 107, the modulation portion 108, the transmission portion 109, and the transmit antenna T01).

With regard to reception processing of the terminal apparatus 1, reception data control information is input to the reception data control portion 104 from the radio resource control portion 110, and physical layer control information which is a control parameter for controlling each block is input to the physical layer control portion 105. The physical layer control information is information which is formed of reception control information and transmission control information and includes a parameter configuration required for radio communication control of the terminal apparatus 1.

The physical layer control information is configured by, for example, a radio connection resource configuration, cell-specific broadcast information, or a system parameter, which is transmitted in an individual (dedicated) manner from the base station apparatus 2 to the terminal apparatus 1, and input to the physical layer control portion 105 as necessary by the radio resource control portion 110. The physical layer control portion 105 appropriately inputs the reception control information which is control information about reception to the reception portion 101, the demodulation portion 102, and the decoding portion 103.

The reception control information includes, as downlink scheduling information, information such as information of a reception frequency band, a reception timing related to physical channels and physical signals, a multiplexing method, and radio resource control information. The reception data control information is downlink control information including secondary cell deactivation timer information, DRX control information, multicast data reception information, downlink retransmission control information, and the like, and includes control information about the downlink of each of the MAC layer, the RLC layer, and the PDCP layer.

A reception signal is received by the reception portion 101 via the receive antenna R01. The reception portion 101 receives a signal from the base station apparatus 2 in accordance with a frequency and a frequency band which are notified by the reception control information. The received signal is input to the demodulation portion 102. The demodulation portion 102 performs demodulation of the signal. The demodulation portion 102 inputs the demodulated signal to the decoding portion 103. The decoding portion 103 decodes the input signal and inputs each decoded data (downlink data and downlink control data, also referred to as a downlink transport block) to the reception data control portion 104. An MAC control element transmitted from the base station apparatus 2 with each data is also decoded at the decoding portion 103 and related data is input to the reception data control portion 104.

The reception data control portion 104 performs control (for example, cell activation/deactivation, DRX control, adjustment of a transmission timing, or the like) of the physical layer control portion 105 based on the received MAC control element, buffering of each decoded data, and error correction control (HARQ) for retransmitted data. Among the respective pieces of data input to the reception data control portion 104, the related data is input (transferred) to the radio resource control portion 110. Among the respective pieces of data input to the radio resource control portion 110, the related data is input (transferred) to a non-access layer portion which is not illustrated.

The cell selection portion 111 has a function of acquiring the received signal and/or a measurement result (RSRP, RSRQ, or the like) of a channel from the demodulation portion 102 and the decoding portion 103, and further carrying out a cell selection procedure on the basis of a cell selection parameter, such as access restriction information or an offset value, which is acquired from broadcast information or the like, and a cell selection parameter input as necessary from the radio resource control portion 110. The cell selection portion 111 also has a function of carrying out a cell reselection procedure for neighboring intra-frequency, inter-frequency, and inter-RAT-frequency cells on the basis of a cell reselection parameter associated with a cell reselection condition input from the radio resource control portion 110.

In the cell reselection procedure, the cell selection portion 111 evaluates (assesses or ranks) the neighboring cells by using at least a measurement result of a serving cell camped currently and a measurement result of the neighboring cells, and when detecting a more suitable cell than the current serving cell, changes a cell to camp on. In the cell reselection, a cell of a frequency to be measured is decided on the basis of frequency priority designated for each frequency (RAT).

Specifically, though the frequency (RAT) having higher priority than frequency priority of the camped frequency (serving frequency) needs to be always measured regardless of a measurement result (reception quality) of the serving cell, a frequency (RAT) whose priority is the same as or lower than the frequency priority of the camped frequency may be measured only when each of measurement results (the RSRP and the RSRQ) of the serving cell is lower than a certain threshold.

Note that, when information of the neighboring cells (neighboring cell list) is notified by the broadcast information, the cell selection portion 111 is also able to perform the cell reselection by using the information of the neighboring cells. The plurality of parameters related to the cell selection procedure and the cell reselection procedure, which are used by the cell selection portion 111, are configured by the radio resource control portion 110.

Moreover, with regard to transmission processing of the terminal apparatus 1, transmission data control information is input from the radio resource control portion 110 to the transmission data control portion 106, and physical layer control information which is a control parameter for controlling each block is input to the physical layer control portion 105. The physical layer control portion 105 appropriately inputs transmission control information, which is control information about transmission, to the coding portion 107, the modulation portion 108, and the transmission portion 109. The transmission control information includes, as uplink scheduling information, information such as coding information, modulation information, information of a transmission frequency band, a transmission timing associated with physical channels and physical signals, a multiplexing method, and radio resource arrangement information.

The transmission data control information is uplink control information which includes DTX control information, random access configuration information, uplink shared channel information, logical channel priority information, resource request configuration information, cell group information, uplink retransmission control information, a buffer status report, and the like. The radio resource control portion 110 may configure plural pieces of random access configuration information corresponding to a plurality of cells to the transmission data control portion 106.

The radio resource control portion 110 manages transmission timing adjustment information and a transmission timing timer, which are used for adjustment of an uplink transmission timing, and manages a state of the uplink transmission timing (a transmission timing adjustment state or a transmission timing non-adjustment state) for each cell (or for each cell group or each TA group). The transmission timing adjustment information and the transmission timing timer are included in the transmission data control information.

The radio resource control portion 110 analyzes an RRC message input from the reception data control portion 104 and acquires information about access restriction by the AS function.

Data (IP packet) mapped into a radio bearer may be mapped by the transmission data control portion 106 into a PTCH which is a logical channel used for the device-to-device data communication, and the data mapped into the PTCH may be mapped into a PSCH as a transport channel used for the device-to-device data communication. The radio resource control portion 110 may regard the data as data of the device-to-device data communication by recognizing or controlling a part or all of the mapping.

Note that, when it is necessary to manage the state of a plurality of uplink transmission timings, the transmission data control portion 106 manages transmission timing adjustment information corresponding to an uplink transmission timing of each of the plurality of cells (or a cell group or a TA group). The resource request configuration information includes at least maximum transmission counter configuration information and radio resource request prohibit timer information. The radio resource control portion 110 may configure plural pieces of resource request configuration information corresponding to a plurality of cells to the transmission data control portion 106.

Transmission data (uplink data and uplink control data, also referred to as an uplink transport block) invoked at the terminal apparatus 1 is input to the transmission data control portion 106 at any timing from the radio resource control portion 110 (or another higher layer). At this time, the transmission data control portion 106 calculates a quantity of the input transmission data (an uplink buffering quantity). Moreover, the transmission data control portion 106 has a function of discriminating whether the input transmission data is data belonging to a control-plane or data belonging to a user-plane. The transmission data control portion 106 also has a function of discriminating whether the input transmission data is transmission data (first transmission data) to the base station apparatus 2 or transmission data (second transmission data) related to the D2D.

Data (IP packet) of the device-to-device data communication, which is mapped into the radio bearer by a not-illustrated higher layer of the radio source control portion 110, may be mapped into the PTCH which is the logical channel used for the device-to-device data communication, and the data mapped into the PTCH may be mapped into the PSCH as the transport channel used for the device-to-device data communication in the transmission data control portion 106. The radio resource control portion 110 may regard the data as data of the device-to-device data communication by recognizing or controlling a part or all of the mapping.

When transmission data is input, the transmission data control portion 106 stores the transmission data in an uplink buffer (not illustrated) in the transmission data control portion 106. Moreover, on the basis of priority of the transmission data stored in the uplink buffer, for example, the transmission data control portion 106 performs multiplexing and assembling and generates an MAC PDU. Then, the transmission data control portion 106 judges whether a radio resource needed for transmission of the input transmission data is assigned to the terminal apparatus 1. On the basis of the assignment of the radio resource, the transmission data control portion 106 selects any one of a radio resource request using a physical uplink shared channel PUSCH and a physical uplink control channel (SR-PUCCH) and a radio resource request using a physical random access channel, and requests, to the physical layer control portion 105, control processing for transmitting the selected channel. Here, the radio resource request may be made separately for the first transmission data and the second transmission data.

In accordance with whether the input transmission data is normal transmission data (first transmission data) to the base station apparatus 2 or transmission data (second transmission data) of the device-to-device data communication to another terminal apparatus 1, the transmission data control portion 106 generates mutually different buffer status reports. In other words, the transmission data control portion 106 generates a buffer status report (a normal buffer status report (Normal BSR), a first buffer status report) based on a buffering quantity of the normal transmission data and a buffer status report (a buffer status report for the device-to-device data communication (ProSe BSR), a second buffer status report) based on a buffering quantity of the transmission data for the device-to-device data communication. In addition, the coding portion 107 appropriately codes each of the data in accordance with the transmission control information, and inputs the resultant to the modulation portion 108. The transmission data control portion 106 may notify the radio resource control portion 110 of presence or absence of the first transmission data and the second transmission data and/or the buffering quantity of the first transmission data and the second transmission data.

The coding portion 107 appropriately codes each of the data in accordance with the transmission control information. The modulation portion 108 performs appropriate modulation processing on the basis of a channel structure for transmitting each of the coded data. The transmission portion 109 maps each of the data subjected to the modulation processing into a frequency domain, converts a signal of the frequency domain into a signal of a time domain, and perform power amplification by carrying the resultant on a carrier wave of a given frequency. The transmission portion 109 adjusts the uplink transmission timing in accordance with the transmission timing adjustment information for each cell (or for each cell group or each TA group) input from the radio resource control portion 110. The physical uplink shared channel in which the uplink control data is arranged may also include, in addition to user data, a layer 3 message (a radio resource control message; an RRC message), for example.

In FIG. 1, though other components of the terminal apparatus 1 and a transmission path of data (control information) between the components are omitted, it is apparent that a plurality of blocks having other functions necessary for operation as the terminal apparatus 1 are included as components. For example, a non-access stratum (NAS) layer portion and an application layer portion, which carry out control with a core network, exist in a higher layer than that of the radio resource control portion 110. An example in which control of the D2D is performed by each portion in the AS layer is indicted in the present embodiment, but the present embodiment is not limited thereto and a D2D control portion which is independent for control of the D2D may perform all or a part of control related to the D2D as described below.

Figure 2:
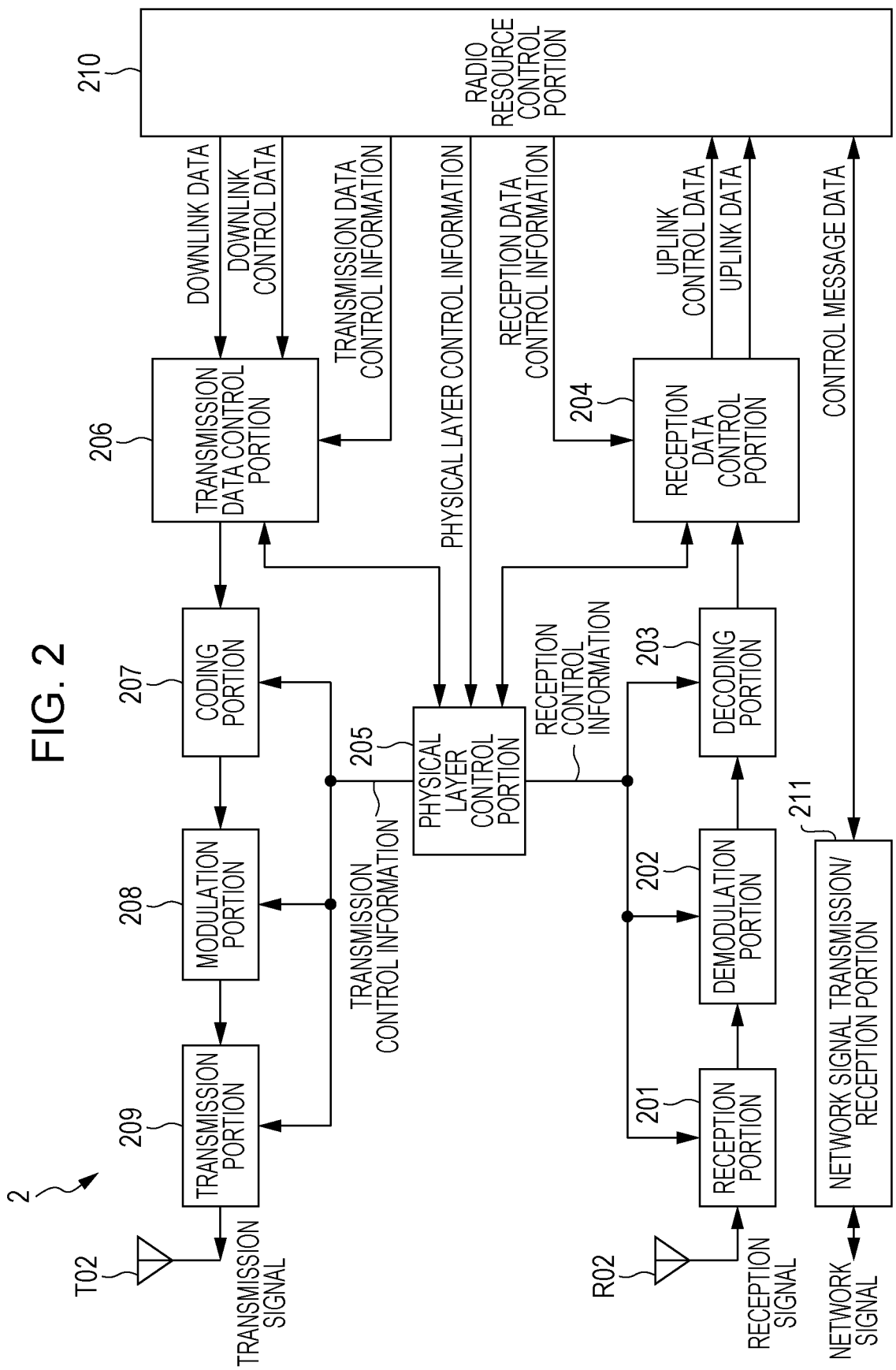
FIG. 2 is a block diagram illustrating an example of a schematic configuration of a base station apparatus according to the embodiment of the invention.

FIG. 2 is a block diagram illustrating an example of the base station apparatus 2 according to the first embodiment of the invention. This base station apparatus 2 is composed of at least a reception portion 201, a demodulation portion 202, a decoding portion 203, a reception data control portion 204, a physical layer control portion 205, a transmission data control portion 206, a coding portion 207, a modulation portion 208, a transmission portion 209, a radio resource control portion 210, a network signal transmission/reception portion 211, a transmit antenna T02, and a receive antenna R02. The "portion" in the figure is an element which executes functions and each procedure of the base station apparatus 2, which is represented also as a term of a section, a circuit, a configuration apparatus, a device, a unit, and the like.

The radio resource control portion 210 is a block that executes each function of an RRC (Radio Resource Control) layer which carries out radio resource control of the base station apparatus 2. The reception data control portion 204 and the transmission data control portion 206 are blocks that execute each function in an MAC (Medium Access Control) layer, an RLC (Radio Link Control) layer, and a PDCP (Packet Data Convergence Protocol) layer which manage a data link layer.

Note that, in order to support transmission and reception processing of a plurality of frequencies (frequency bands, frequency bandwidths) or in the same subframe of a cell through the carrier aggregation or the like, the base station apparatus 2 may have a configuration including a plurality of sets each of which is formed by a part or whole of reception-based blocks (the reception portion 201, the demodulation portion 202, the decoding portion 203, and the receive antenna R02), the plurality of frequencies (frequency bands, frequency bandwidths), and transmission-based blocks (the coding portion 207, the modulation portion 208, the transmission portion 209, and the transmit antenna T02).

The radio resource control portion 210 inputs downlink data and downlink control data to the transmission data control portion 206. When there is an MAC control element to be transmitted to the terminal apparatus 1, the transmission data control portion 206 inputs the MAC control element and each of the data (downlink data or downlink control data) to the coding portion 207. The coding portion 207 codes the MAC control element and each of the data, which are input, and inputs the resultant to the modulation portion 208. The modulation portion 208 performs modulation of a coded signal.

The signal modulated by the modulation portion 208 is input to the transmission portion 209. After mapping the input signal into a frequency domain, the transmission portion 209 converts the signal of the frequency domain into a signal of a time domain, performs power amplification by carrying the resultant on a carrier wave of a given frequency, and transmits the signal via the transmit antenna T02. A physical downlink shared channel in which the downlink control data is arranged typically configures a layer 3 message (RRC message).

The reception portion 201 converts a signal, which is received from the terminal apparatus 1 via the receive antenna R02, into a base-band digital signal. When cells of a plurality of different transmission timings are configured to the terminal apparatus 1, the reception portion 201 receives a signal at different timings for each cell (or for each cell group or each TA group). The digital signal converted at the reception portion 201 is input to the demodulation portion 202 and demodulated. The signal demodulated at the demodulation portion 202 is subsequently input to the decoding portion 203. The decoding portion 203 decodes the input signal and inputs each decoded data (uplink data and uplink control data) to the reception data control portion 204. The MAC control element which is transmitted from the terminal apparatus 1 with each of the data is also decoded at the decoding portion 203, and related data is input to the reception data control portion 204.

The reception data control portion 204 performs control (for example, control related to a power headroom report, control related to a buffer status report, etc.) of the physical layer control portion 205 based on the received MAC control element, buffering of each of the decoded data, and error correction control (HARQ) for retransmitted data. Each of the data input to the reception data control portion 204 is input (transferred) to the radio resource control portion 210 as necessary.

In addition, when the buffer status report from the terminal apparatus 1 is input from the decoding portion 203, the reception data control portion 204 discriminates between a transmission resource request for communication with the base station apparatus and a transmission resource request for the device-to-device data communication, and configures a transmission resource to be assigned to the terminal apparatus 1.

Physical layer control information needed for control of each of the blocks is information which is composed of reception control information and transmission control information and includes a parameter configuration needed for radio communication control of the base station apparatus 2. The physical layer control information is configured by a higher network apparatus (MME, a gateway apparatus (SGW), OAM, or the like) or a system parameter, and input to the control portion 204 as necessary by the radio resource control portion 210.

The physical layer control portion 205 inputs the physical layer control information involved in transmission as the transmission control information to each of the blocks of the coding portion 207, the modulation portion 208, and the transmission portion 209, and appropriately inputs the physical layer control information involved in reception as the reception control information to each of the blocks of the reception portion 201, the demodulation portion 202, and the decoding portion 203.

Reception data control information includes control information about the uplink of the terminal apparatus 1, which corresponds to each of the MAC layer, the RLC layer, and the PDCP layer of the base station apparatus 2. Transmission data control information includes control information about the downlink of the terminal apparatus 1, which corresponds to each of the MAC layer, the RLC layer, and the PDCP layer of the base station apparatus 2. That is, the reception data control information and the transmission data control information are configured for each terminal apparatus 1.

The network signal transmission/reception portion 211 performs transmission (transfer) or reception of a control message or user data between base station apparatuses 2 or between a higher network apparatus (MME, SGW) and the base station apparatus 2. In FIG. 2, though other components of the base station apparatus 2 and a transmission path of data (control information) between the components are omitted, it is apparent that a plurality of blocks having other functions necessary for operation as the base station apparatus 2 are included as components. For example, a radio resource management portion and an application layer portion exist in a higher layer than that of the radio resource control portion 210.

Next, an example of connection re-establishment control in the case of a failure in radio link by the terminal apparatus 1 in the present embodiment will be described with reference to a flowchart of FIG. 3.

Figure 3:
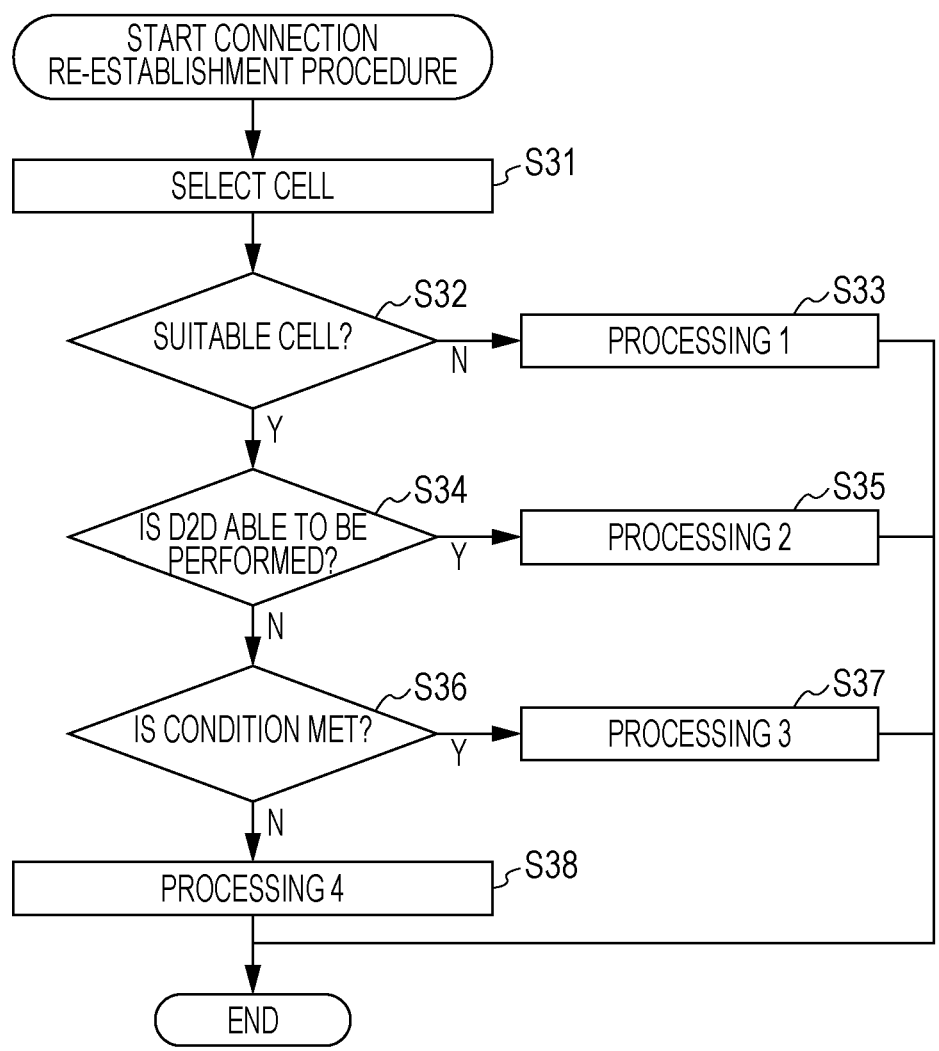
FIG. 3 illustrates an example of a flowchart related to a radio resource control connection re-establishment procedure in a first embodiment of the invention.

In FIG. 3, the terminal apparatus 1 selects a cell in accordance with a cell selection procedure in order to re-establish connection (step S31). For example, the terminal apparatus 1 performing the D2D holds information (an identifier or a frequency of a cell) of a finally camped cell supporting the D2D and executes cell search using the held information, and when being not able to detect a suitable cell in the cell or the frequency of the cell, performs detection of a suitable cell by regarding other frequencies as detection targets. When a suitable cell is not able to be detected by any search, a restricted cell is searched for. Alternatively, when a suitable cell in the cell or the frequency of the cell is not able to be detected after executing cell search using the held information, a restricted cell at the frequency may be detected. Alternatively, it may be configured so that a cell that does not support the D2D (for example, a cell in which D2D information is not informed as broadcast information (system information block 18 is not informed)) is not regarded as a suitable cell, or a cell that does not support the D2D may be regarded as a restricted cell or a barred cell. Such processing may be continued until the timer T311 expires or stops.

At step S32, whether or not a suitable cell is found at step S31 is determined, and when a suitable cell is found, the procedure proceeds to step S34, and when a suitable cell is not found, processing 1 is executed (step S33).

As the processing 1 (step S33), for example, when the terminal apparatus 1 performing the D2D selects a restricted cell of the frequency supporting the D2D, the radio resource control portion 110 may notify a higher layer of information indicating that the D2D is not able to be performed so that the D2D is not performed, or may perform the device-to-device data communication of the Mode 2 in the restricted cell. Alternatively, when the terminal apparatus 1 performing the D2D selects a restricted cell of a frequency other than the frequency supporting the D2D, the radio resource control portion 110 may notify the higher layer of information indicating that D2D is not able to be performed so that the D2D is not performed, or may perform the device-to-device data communication of the Mode 2 in a different frequency supporting the D2D while camping on the restricted cell. The terminal apparatus 1 which is not able to select a suitable cell shifts to the idle mode and camps on the restricted cell.

At step S34, the terminal apparatus 1 determines whether or not the D2D is able to be performed in the frequency on which the terminal apparatus 1 camps, and when determining that the D2D is not able to be performed, the procedure proceeds to step S36, and when determining that the D2D is able to be performed, processing 2 is executed (step S35).

As the processing 2 (step S35), for example, the terminal apparatus 1 transmits a connection re-establishment request message in the selected cell to the base station apparatus 2 and executes the remaining procedure of the connection re-establishment. Here, the DRB for transmission data (second transmission data) and reception data which are related to the D2D may be continued without being suspended when the connection re-establishment procedure is carried out. In this case, while carrying out the connection re-establishment procedure, the terminal apparatus 1 is able to perform transmission or reception of the D2D of the Mode 2 when being permitted even after the assigned resource of the Mode 1 is released. Further, when there is the second transmission data, the terminal apparatus 1 makes a transmission resource request of the device-to-device data communication to the base station apparatus 2.

At step S36, the terminal apparatus 1 determines whether or not to perform processing 3 described later. A condition for performing the processing 3 is that (1) the terminal apparatus 1 is in a state of not being able to continue transmission of the D2D when the selected cell is used as a serving cell (PCell) and there is transmission data related to the D2D, (2) the terminal apparatus 1 is in a state of not being able to continue reception of the D2D when the selected cell is used as a serving cell (PCell) and the D2D is being received, (3) system information informed by the selected cell includes a frequency in which a service of the D2D is provided and the D2D service in which the terminal apparatus 1 is interested (communication has been performed) is included in the frequency, (4) the selected cell supports notification by the terminal apparatus 1 (in the processing 3), or the like, and a combination thereof may be used. When the condition for performing the processing 3 is met, the procedure proceeds to step S37 and the processing 3 is executed, and when the condition is not met, the procedure proceeds to step S38 and the aforementioned processing 4 is executed.

As the processing 3 (step S37), for example, the terminal apparatus 1 transmits a connection re-establishment request message in the selected cell to the base station apparatus 2 and executes the remaining procedure of the connection re-establishment. When the connection re-establishment is performed successfully, the terminal apparatus 1 transmits, to the base station apparatus, information (such as information of an identifier and a frequency of a desired service or (a plurality of) frequencies in which the service desired by the terminal apparatus 1 is able to be performed) indicating that the terminal apparatus 1 is interested in the D2D. In this case, in a case where the DRB for the transmission data (second transmission data) related to the D2D and the reception data related to the D2D is set to be continued without being suspended when the connection re-establishment procedure is carried out, the DRB may be suspended or released when the connection re-establishment procedure is carried out successfully.

As the processing 4 (step S38), for example, the terminal apparatus 1 transmits a connection re-establishment request message in the selected cell to the base station apparatus 2 and executes the remaining procedure of the connection re-establishment. In this case, in a case where the DRB for the transmission data (second transmission data) related to the D2D and the reception data related to the D2D is set to be continued without being suspended when the connection re-establishment procedure is carried out, the DRB may be suspended or released when the connection re-establishment procedure is carried out successfully.

With the configuration as described above, for example, the terminal apparatus 1 is able to select a suitable cell by considering the D2D when selecting the cell. By performing control of the bearer related to the D2D in the connection re-establishment procedure, the connection re-establishment is able to be efficiently performed. In the cell in which the connection is re-established, it is possible to notify the base station apparatus 2 of information about the D2D as necessary.

According to the first embodiment, in a case where radio resource control connection is re-established, the terminal apparatus 1 performs cell selection in consideration of a frequency of the D2D and/or processing according to whether or not the D2D is able to be performed in the selected cell and a state of the D2D of the terminal apparatus 1, so that connection control when performing device-to-device communication is able to be efficiently performed.

Second Embodiment

A second embodiment of the invention will be described below.

An example in which radio resource control connection is re-established in consideration of a service of the D2D has been indicated in the first embodiment. In the present embodiment, an example in which the terminal apparatus 1 determines whether or not to perform (continue) radio resource control connection re-establishment by considering a service of the D2D will be described.

In the terminal apparatus 1 and the base station apparatus 2 used in the present embodiment, the radio resource control portion 110 is operated differently from that of the first embodiment, and other detailed description will be omitted.

In the present embodiment, the radio resource control portion 110 inputs transmission data control information to the transmission data control portion 106 and inputs physical layer control information which is a control parameter for controlling each block to the physical layer control portion 105. The transmission data control information is uplink control information including DTX control information, random access configuration information, uplink shared channel information, logical channel priority information, resource request configuration information, cell group information, uplink retransmission control information, a buffer status report, and the like. The radio resource control portion 110 in the present embodiment may configure, to the transmission data control portion 106, plural pieces of random access configuration information corresponding to a plurality of cells.

In the present embodiment, the radio resource control portion 110 manages transmission timing adjustment information and a transmission timing timer, which are used for adjustment of an uplink transmission timing, and manages a state of the uplink transmission timing (a transmission timing adjustment state or a transmission timing non-adjustment state) for each cell (or for each cell group or each TA group). The transmission timing adjustment information and the transmission timing timer are included in the transmission data control information.

In the present embodiment, the radio resource control portion 110 analyzes an RRC message input from the reception data control portion 104 and acquires information about access restriction by the AS function.

Data (IP packet) mapped into a radio bearer may be mapped by the transmission data control portion 106 into a PTCH which is a logical channel used for the device-to-device data communication, and the data mapped into the PTCH may be mapped into a PSCH which is a transport channel used for the device-to-device data communication. The radio resource control portion 110 may regard the data as data of the device-to-device data communication by recognizing or controlling a part or all of the mapping.

Note that, when it is necessary to manage the state of a plurality of uplink transmission timings, the transmission data control portion 106 manages transmission timing adjustment information corresponding to an uplink transmission timing of each of the plurality of cells (or a cell group or a TA group). The resource request configuration information includes at least maximum transmission counter configuration information and radio resource request prohibit timer information. The radio resource control portion 110 may configure, to the transmission data control portion 106, plural pieces of resource request configuration information corresponding to a plurality of cells.

Transmission data (uplink data and uplink control data, also referred to as an uplink transport block) invoked at the terminal apparatus 1 is input to the transmission data control portion 106 at any timing from the radio resource control portion 110 (or another higher layer).

In the present embodiment, the radio resource control portion 110 determines, in the radio resource control connection re-establishment procedure, whether or not to continue the radio resource control connection re-establishment procedure on the basis of information about cell selection, which is acquired from the cell selection portion 111, presence or absence of transmission data to be acquired from the transmission data control portion 106, or a buffering quantity.

Next, an example of connection re-establishment control in the case of a failure in radio link by the terminal apparatus 1 in the present embodiment will be described with reference to a flowchart of FIG. 4.

Figure 4:
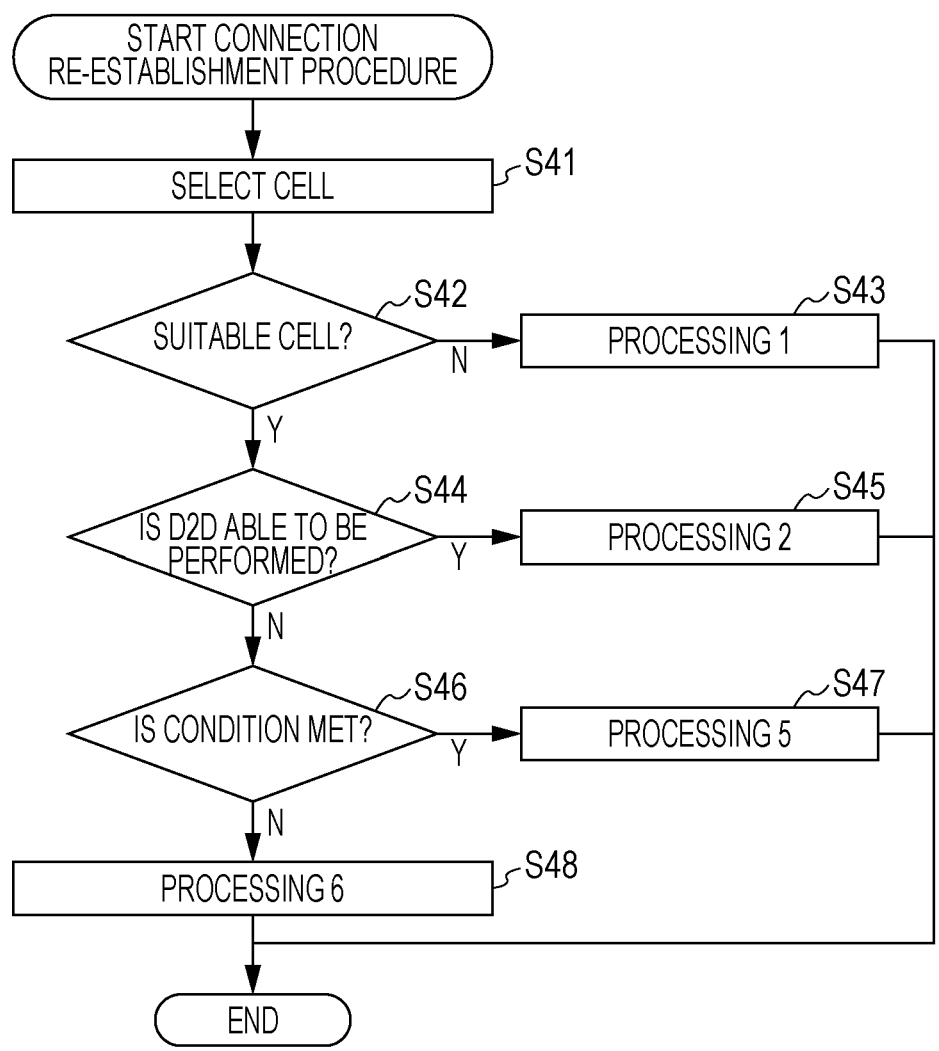
FIG. 4 illustrates an example of a flowchart related to a radio resource control connection re-establishment procedure in a second embodiment of the invention.

In FIG. 4, the terminal apparatus 1 selects a cell in accordance with a cell selection procedure in order to re-establish connection (step S41). For example, the terminal apparatus 1 performing the D2D holds information (an identifier or a frequency of a cell) of a finally camped cell supporting the D2D and executes cell search using the held information, and when being not able to detect a suitable cell in the cell or the frequency of the cell, performs detection of a suitable cell by regarding other frequencies as detection targets. When a suitable cell is not able to be detected by any search, a restricted cell is searched for. Alternatively, when a suitable cell in the cell or the frequency of the cell is not able to be detected after executing cell search using the held information, a restricted cell at the frequency may be detected. Alternatively, it may be configured so that a cell that does not support the D2D (for example, a cell in which D2D information is not informed as broadcast information (system information block 18 is not informed)) is not regarded as a suitable cell, or a cell that does not support the D2D may be regarded as a restricted cell or a barred cell. Such processing may be continued until the timer T311 expires or stops.

At step S42, whether or not a suitable cell is found at step S41 is determined, and when a suitable cell is found, the procedure proceeds to step S44, and when a suitable cell is not found, processing 1 is executed (step S43).

As the processing 1 (step S43), for example, when the terminal apparatus 1 performing the D2D selects a restricted cell of the frequency supporting the D2D, the radio resource control portion 110 may notify a higher layer of information indicating that the D2D is not able to be performed so that the D2D is not performed, or may perform the device-to-device data communication of the Mode 2 in the restricted cell. Alternatively, when the terminal apparatus 1 performing the D2D selects a restricted cell of a frequency other than the frequency supporting the D2D, the radio resource control portion 110 may notify the higher layer of information indicating that the D2D is not able to be performed so that the D2D is not performed, or may perform the device-to-device data communication of the Mode 2 in a different frequency supporting the D2D while camping on the restricted cell. The terminal apparatus 1 which is not able to select a suitable cell shifts to the idle mode and camps on the restricted cell.

At step S44, the terminal apparatus 1 determines whether or not the D2D is able to be performed in the frequency on which the terminal apparatus 1 camps, and when determining that the D2D is not able to be performed, the procedure proceeds to step S46, and when determining that the D2D is able to be performed, processing 2 is executed (step S45).

As the processing 2 (step S45), for example, the terminal apparatus 1 transmits a connection re-establishment request message in the selected cell to the base station apparatus 2 and executes the remaining procedure of the connection re-establishment. Here, the DRB for transmission data (second transmission data) and reception data which are related to the D2D may be continued without being suspended when the connection re-establishment procedure is carried out. In this case, while carrying out the connection re-establishment procedure, the terminal apparatus 1 is able to perform transmission or reception of the D2D of the Mode 2 when being permitted even after the assigned resource of the Mode 1 is released.

At step S46, the terminal apparatus 1 determines whether or not to perform processing 5 described later. A condition for performing the processing 5 is that (1) a DRB that is suspended includes a normal DRB of transmission and reception data with the base station apparatus 2, (2) PDCP/RLC entity that is suspended includes PDCP/RLC entity established between the terminal apparatus 1 and the base station apparatus 2, (3) system information informed by the selected cell includes a frequency in which a service of the D2D is provided and the D2D service in which the terminal apparatus 1 is interested (communication has been performed) is included in the frequency, (4) the selected cell supports notification by the processing 3 in the first embodiment, or the like, and a combination thereof may be used. When the condition for performing the processing 5 is met, the procedure proceeds to step S47 and the processing 5 is executed, and when the condition is not met, the procedure proceeds to step S48 and processing 6 is executed.

As the processing 5 (step S47), for example, the terminal apparatus 1 transmits a connection re-establishment request message in the selected cell to the base station apparatus 2 and executes the remaining procedure of the connection re-establishment. In this case, in a case where the DRB for the transmission data (second transmission data) related to the D2D and the reception data related to the D2D is set to be continued without being suspended when the connection re-establishment procedure is carried out, the DRB may be suspended or released when the connection re-establishment procedure is carried out successfully. Moreover, step S36 of FIG. 3 in the first embodiment may be executed as the processing 5.

As processing 6 (step S48), for example, the terminal apparatus 1 stops the timer T311, terminates the connection re-establishment procedure, and shifts to the idle mode.

With the configuration as described above, for example, the terminal apparatus 1 is able to select a suitable cell by considering the D2D when selecting the cell. By performing control of the bearer related to the D2D in the connection re-establishment procedure, the connection re-establishment is able to be efficiently performed. In the cell in which the connection is re-established, it is possible to notify the base station apparatus 2 of information about the D2D as necessary. It is also possible to terminate unnecessary connection re-establishment as necessary.

According to the second embodiment, in a case where radio resource control connection is re-established, the terminal apparatus 1 performs cell selection in consideration of a frequency of the D2D and/or processing according to whether or not the D2D is able to be performed in the selected cell and a state of the D2D of the terminal apparatus 1, so that connection control when performing device-to-device communication is able to be efficiently performed.

In each of the embodiments, in order for the terminal apparatus 1 performing the D2D to efficiently perform cell selection when radio resource control connection is re-established, the base station apparatus 2 may include, on the basis of information related to interest in the D2D (transmission and reception) that is notified from the terminal apparatus 1 or terminal capability information, a frequency, in which the terminal apparatus 1 is able to perform the D2D, in a measurement target of a measurement configuration which is notified to the terminal apparatus 1 as a radio resource control message and configured.

In each of the embodiments, another apparatus may have the function of the base station apparatus 2. For example, the terminal apparatus 1 serving as a parent apparatus of device-to-device data communication or a second terminal apparatus 1 that provides information to a first terminal apparatus 1 out-of-coverage of the base station apparatus 2 may have the function.

Further, though description has been given for connection control for the base station apparatus 2 when a radio resource request of device-to-device data communication is made in each of the embodiments, each of the embodiments is not limited thereto and may be applied to a radio resource request of the ProSe Didcovery.

Note that, the embodiments described above are only exemplifications, and may be realized by using various modified examples and substitution examples. For example, an uplink transmission scheme may be applied also to communication systems of both an FDD (frequency division duplex) scheme and a TDD (time division duplex) scheme. In addition, names of respective parameters and respective events, which are indicated in the embodiments, are given for convenience of description, and even when names in practical use and names of the embodiments of the invention are different, there is no influence on the gist of the invention which is claimed by the embodiments of the invention.

"Connection" used in each of the embodiments does not suggest to be limited only to a configuration in which a certain apparatus and a certain different apparatus are directly connected by using a physical line, and also includes a configuration of logical connection and a configuration of wireless connection by using wireless technologies.

The terminal apparatus 1 includes apparatuses having a communication function, such as not only a portable or movable mobile station apparatus, but also stationary or unmovable electronic equipment which is installed indoors and outdoors such as, for example, AV equipment, kitchen equipment, a cleaning/washing machine, air conditioning equipment, office equipment, an automatic vending machine, other domestic equipment, measurement equipment, an in-vehicle device, and further, wearable equipment which is wearable, or healthcare equipment. Further, the terminal apparatus 1 is used not only for person to person or person to equipment communication, but also for equipment to equipment communication (Machine Type Communication).

The terminal apparatus 1 is also referred to as a user terminal, a mobile station apparatus, a communication terminal, a moving body, a terminal, UE (User Equipment), or an MS (Mobile Station). The base station apparatus 2 is also referred to as a radio base station apparatus, a base station, a radio base station, a fixed station, NB (NodeB), eNB (evolved NodeB), a BTS (Base Transceiver Station), or a BS (Base Station).

Note that, the base station apparatus 2 is referred to as NB in UMTS which is prescribed by the 3GPP, and as eNB in the EUTRA and the Advanced EUTRA. Note that, the terminal apparatus 1 in the UMTS, which is prescribed by the 3GPP, the EUTRA, and the Advanced EUTRA is referred to as UE.

Further, though steps of a method, means, or algorithm for realizing functions or a part of functions of each portion of the terminal apparatus 1 and the base station apparatus 2 have been described specifically in combination by using functional block diagrams for convenience of description, they may be embodied directly in hardware, in a software module executed by a processor, or in a combination thereof.

If being implemented in hardware, the terminal apparatus 1 and the base station apparatus 2 are configured by a feeding apparatus or a battery for supplying power to the terminal apparatus 1 and the base station apparatus 2, a display apparatus of a liquid crystal or the like and a display drive apparatus, a memory, an input/output interface and an input/output terminal, a speaker, or other peripheral apparatuses, in addition to the described configuration of the block diagram.

If being implemented in software, the function may be held or transmitted as one or more commands or codes on a computer readable medium. The computer readable media include both communication media and computer recording media including a medium that facilitates transferring a computer program from one place to another place.

Then, control of the terminal apparatus 1 and the base station apparatus 2 may be performed by recording one or more commands or codes in a computer readable recording medium and causing a computer system to read the one or more commands or codes recorded in this recording medium for execution. Note that, the "computer system" here is set to include an OS and hardware such as peripheral equipment.

Operations described in each of the embodiments of the invention may be realized by a program. The program which is operated at the terminal apparatus 1 and the base station apparatus 2 related to each of the embodiments of the invention is a program (program causing a computer to function) which controls a CPU or the like so as to realize the functions of the embodiments related to each of the embodiments of the invention. In addition, information handled in these apparatuses is temporarily accumulated in a RAM during processing thereof, and then stored in various ROMs or HDDs to be read out by the CPU as necessary, for correction and writing.

In addition, although the functions of the embodiments described above are realized by executing the program, the functions of each of the embodiments of the invention are also realized in some cases by performing processing on the basis of instructions of the program in conjunction with an operating system, other application programs, or the like.

Moreover, the "computer readable recording medium" refers to a portable medium such as a semiconductor medium (for example, such as a RAM or a nonvolatile memory card), an optical recording medium (for example, such as a DVD, an MO, an MD, a CD or a BD), a magnetic recording medium (for example, a magnetic tape or a flexible disk), or a storage apparatus including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

The aforementioned program may be one for realizing a part of the functions described above, and further may be one capable of realizing the functions described above by being combined with a program which has been already recorded in a computer system.

Each functional block or various features of the terminal apparatus 1 and the base station apparatus 2 used in each of the embodiments may be implemented or executed by a general-purpose processor, a digital signal processor (DSP), an application specific integrated circuit (ASIC) or a general application integrated circuit (IC), a field programmable gate array signal (FPGA) or other programmable logic devices, discrete gates or transistor logic, or a discrete hardware component, which is designed to exhibit at least the functions described in the present specification, or a combination thereof.

The general-purpose processor may be a microprocessor, or, alternatively, the processor may be a conventional processor, a controller, a microcontroller, or a state machine. The general-purpose processor or each circuit described above may be configured by a digital circuit or may be configured by an analogue circuit.

The processor may be implemented also as a combination with a computing device. For example, a DSP and a microprocessor, a plurality of microprocessors, one or more microprocessors connected to a DSP core, or other such configurations are combined.

As above, the embodiments of the invention have been described in detail on the basis of specific examples, however, it is clear that a gist of each embodiment and a scope of Claims of the invention are not limited to these specific examples, and design change and the like which are not departed from the gist of the invention are also included. That is, the description in the present specification aims to give exemplary description and does not give any limitation to each embodiment of the invention.

The invention can be modified in various manners within the scope defined by the Claims, and embodiments obtained by appropriately combining technical means disclosed in different embodiments are also encompassed by the technical scope of the invention. A configuration in which elements described in each of the embodiments and achieving similar effects are replaced with each other is also encompassed in the technical scope of the invention.

[Summary]

(1) As described above, the present invention takes the following means in order to achieve the aforementioned object. That is, a terminal apparatus according to an embodiment of the invention performs data communication with a base station apparatus and device-to-device data communication that is direct data communication between terminal apparatuses with use of a radio resource configured by the base station apparatus. In the terminal apparatus, at a time of re-establishing radio resource control connection with the base station apparatus, at least on a basis of whether or not the device-to-device data communication is able to be performed in a cell of the base station apparatus and whether or not there is data of the device-to-device data communication in the terminal apparatus, information about the device-to-device data communication, which is to be notified to the base station apparatus, is selected and notified.

(2) A terminal apparatus according to an embodiment of the invention performs data communication with a base station apparatus and device-to-device data communication that is direct data communication between terminal apparatuses with use of a radio resource configured by the base station apparatus. In the terminal apparatus, at a time of re-establishing radio resource control connection with the base station apparatus, at least on a basis of whether or not the device-to-device data communication is able to be performed in a cell of the base station apparatus, control for continuing, suspending, or releasing a data radio bearer of the device-to-device data communication is performed.

(3) In the terminal apparatus according to the embodiment of the invention, in a case where a data radio bearer that is suspended in the terminal apparatus does not include a data radio bearer, which is established between the terminal apparatus and the base station apparatus, at a time of re-establishing radio resource control connection, a resource control connection re-establishment procedure is further terminated.

(4) A control method according to an embodiment of the invention is applied to a terminal apparatus that performs data communication with a base station apparatus and device-to-device data communication that is direct data communication between terminal apparatuses with use of a radio resource configured by the base station apparatus. The control method includes at least the step of, at a time of re-establishing radio resource control connection with the base station apparatus, at least on a basis of whether or not the device-to-device data communication is able to be performed in a cell of the base station apparatus and whether or not there is data of the device-to-device data communication in the terminal apparatus, selecting and notifying information about the device-to-device data communication, which is to be notified to the base station apparatus.

(5) A control method according to an embodiment of the invention is applied to a terminal apparatus that performs data communication with a base station apparatus and device-to-device data communication that is direct data communication between terminal apparatuses with use of a radio resource configured by the base station apparatus. The control method includes at least the step of, at a time of re-establishing radio resource control connection with the base station apparatus, at least on a basis of whether or not the device-to-device data communication is able to be performed in a cell of the base station apparatus, performing control for continuing, suspending, or releasing a data radio bearer of the device-to-device data communication.

(6) The notification method according to the embodiment of the invention further includes the step of, in a case where a data radio bearer that is suspended in the terminal apparatus does not include a data radio bearer, which is established between the terminal apparatus and the base station apparatus, at a time of re-establishing radio resource control connection, terminating a radio resource control connection re-establishment procedure.

(7) An integrated circuit according to an embodiment of the invention is mounted in a terminal apparatus that performs data communication with a base station apparatus and device-to-device data communication that is direct data communication between terminal apparatuses with use of a radio resource configured by the base station apparatus. The integrated circuit causes the terminal apparatus to exert the function of, at a time of re-establishing radio resource control connection with the base station apparatus, at least on a basis of whether or not the device-to-device data communication is able to be performed in a cell of the base station apparatus and whether or not there is data of the device-to-device data communication in the terminal apparatus, selecting and notifying information about the device-to-device data communication, which is to be notified to the base station apparatus.

(8) An integrated circuit according to an embodiment of the invention is mounted in a terminal apparatus that performs data communication with a base station apparatus and device-to-device data communication that is direct data communication between terminal apparatuses with use of a radio resource configured by the base station apparatus. The integrated circuit causes the terminal apparatus to exert the function of, at a time of re-establishing radio resource control connection with the base station apparatus, at least on a basis of whether or not the device-to-device data communication is able to be performed in a cell of the base station apparatus, performing control for continuing, suspending, or releasing a data radio bearer of the device-to-device data communication.

(9) The integrated circuit according the embodiment of the invention causes the terminal apparatus to further exert the function of, in a case where a data radio bearer that is suspended in the terminal apparatus does not include a data radio bearer, which is established between the terminal apparatus and the base station apparatus, at a time of re-establishing radio resource control connection, terminating a radio resource control connection re-establishment procedure.

REFERENCE SIGNS LIST 1 terminal apparatus
2, 2-1, 2-2 base station apparatus
101, 201 reception portion
102, 202 demodulation portion
103, 203 decoding portion
104, 204 reception data control portion
105, 205 physical layer control portion
106, 206 transmission data control portion
107, 207 coding portion
108, 208 modulation portion
109, 209 transmission portion
110, 210 radio resource control portion
111 cell selection portion
211 network signal transmission/reception portion

The invention claimed is:

1. A terminal apparatus that performs data communication with a base station apparatus and device-to-device data communication that is direct data communication between terminal apparatuses with use of a radio resource configured by the base station apparatus, comprising:
   a transmitter that determines whether or not to make a notification, to the base station apparatus, of information indicating that the terminal apparatus is interested in the data communication between terminal apparatuses, wherein:
   the information includes a frequency of the data communication between terminal apparatuses,
   whether or not the information is notified to the base station apparatus is determined at least on a basis of (i) whether or not a system information block is being broadcasted in a cell of the base station apparatus, the system information block indicating that the base station apparatus supports the device-to-device data communication by the terminal apparatus and (ii) whether or not transmission, by the terminal apparatus, of the device-to-device data communication is configured, and
   in a case where the cell does not support the notification of the information, connection with the base station apparatus is reestablishes by ending a connection re-establishment procedure without carrying out the notification of the information to the base station apparatus.

2. A control method applied to a terminal apparatus that performs data communication with a base station apparatus and device-to-device data communication that is direct data communication between terminal apparatuses with use of a radio resource configured by the base station apparatus, comprising at least the step of:
   determining, whether or not to make a notification, by a transmitter to the base station apparatus, of information indicating that the terminal apparatus is interested in the data communication between terminal apparatuses, wherein:
   the information includes a frequency of the data communication between terminal apparatuses,
   whether or not the information is notified to the base station apparatus is determined at least on a basis of (i) whether or not a system information block is being broadcasted in a cell of the base station apparatus, the system information block indicating that the base station apparatus supports the device-to-device data communication by the terminal apparatus and (ii) whether or not transmission, by the terminal apparatus, of the device-to-device data communication is configured, and
   in a case where the cell does not support the notification of the information, connection with the base station a aratus is reestablished b ending a connection re-establishment procedure without cam in out the notification of the information to the base station apparatus.

3. An integrated circuit mounted in a terminal apparatus that performs data communication with a base station apparatus and device-to-device data communication that is direct data communication between terminal apparatuses with use of a radio resource configured by the base station apparatus, the integrated circuit causing the terminal apparatus to exert the function of:

determining whether or not to make a notification, by a transmitter to the base station apparatus, of information indicating that the terminal apparatus is interested in the data communication between terminal apparatuses, wherein:

the information includes a frequency of the data communication between terminal apparatuses, whether or not the information is notified to the base station apparatus is determined at least on a basis of (i) whether or not a system information block is being broadcasted in a cell of the base station apparatus, the system information block indicating that the base station apparatus supports the device-to-device data communication by the terminal apparatus and (ii) whether or not transmission, by the terminal apparatus, of the device-to-device data communication is configured, and in a case where the cell does not support the notification of the information, connection with the base station apparatus k reestablished by ending a connection re-establishment procedure without carrying out the notification of the information to the base station apparatus.

4. The terminal apparatus of claim 1, wherein the terminal apparatus performs data communication with the base station apparatus which has a plurality of cells having different frequencies.

5. The control method of claim 2, wherein the terminal apparatus performs data communication with the base station apparatus which has a plurality of cells having different frequencies.

6. The integrated circuit of claim 3, wherein the terminal apparatus performs data communication with the base station apparatus which has a plurality of cells having different frequencies.

* * * * *